US010088251B2

(12) United States Patent
Raman et al.

(10) Patent No.: US 10,088,251 B2
(45) Date of Patent: Oct. 2, 2018

(54) RADIATIVE COOLING WITH SOLAR SPECTRUM REFLECTION

(71) Applicant: The Board of Trustees of the Leland Stanford Junior University, Palo Alto, CA (US)

(72) Inventors: Aaswath Pattabhi Raman, Menlo Park, CA (US); Shanhui Fan, Stanford, CA (US); Eden Rephaeli, Menlo Park, CA (US); Linxiao Zhu, Stanford, CA (US); Marc Anoma, Palo Alto, CA (US); Eli Goldstein, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 357 days.

(21) Appl. No.: 14/719,116

(22) Filed: May 21, 2015

(65) Prior Publication Data

US 2015/0338175 A1    Nov. 26, 2015

Related U.S. Application Data

(60) Provisional application No. 62/001,405, filed on May 21, 2014.

(51) Int. Cl.
*F25B 23/00* (2006.01)
*F28F 13/18* (2006.01)
(Continued)

(52) U.S. Cl.
CPC ............... *F28F 13/18* (2013.01); *B60H 1/32* (2013.01); *F24F 5/0089* (2013.01);
(Continued)

(58) Field of Classification Search
CPC ...................................................... F25B 23/003
(Continued)

(56) References Cited

U.S. PATENT DOCUMENTS

| 4,323,619 A | * | 4/1982 | Silvestrini et al. ... F25B 23/003 428/207 |
| 4,423,605 A | * | 1/1984 | Petrick et al. ........ F25B 23/003 126/569 |

(Continued)

OTHER PUBLICATIONS

Catalanotti, S., et al. "The radiative cooling of selective surfaces." Solar Energy 17.2 (1975): 83-89. Abstract Only.
(Continued)

*Primary Examiner* — Allen Flanigan
(74) *Attorney, Agent, or Firm* — Crawford Maunu PLLC

(57) ABSTRACT

Various aspects as described herein are directed to a radiative cooling apparatuses and methods for cooling an object. As consistent with one or more embodiments, a radiative cooling apparatus includes an arrangement of a plurality of different material located at different depths along a depth dimension relative to the object. The plurality of different material includes a solar spectrum reflecting portion configured and arranged to suppress light modes, thereby inhibiting coupling of the incoming electromagnetic radiation, of at least some wavelengths in the solar spectrum, to the object at a range of angles of incidence relative to the depth dimension. Further, the plurality of material includes a thermally-emissive arrangement configured and arranged to facilitate, simultaneously with the inhibiting coupling of the incoming electromagnetic radiation, the thermally-generated electromagnetic emissions from the object at the range of angles of incidence and in mid-IR wavelengths.

20 Claims, 18 Drawing Sheets

(51) Int. Cl.
    F28F 3/12      (2006.01)
    F24F 5/00      (2006.01)
    B60H 1/32      (2006.01)
    F28F 13/00     (2006.01)
(52) U.S. Cl.
    CPC .......... *F24F 5/0092* (2013.01); *F25B 23/003* (2013.01); *F28F 3/12* (2013.01); *F28F 2013/008* (2013.01); *F28F 2245/06* (2013.01)
(58) Field of Classification Search
    USPC ...................................... 62/DIG. 1; 165/185
    See application file for complete search history.

(56) References Cited

U.S. PATENT DOCUMENTS

| | | | | |
|---|---|---|---|---|
| 4,586,350 A | * | 5/1986 | Berdahl ............... | F25B 23/003 359/360 |
| 2005/0064094 A1 | * | 3/2005 | Wojtysiak et al. ...... | C09D 5/00 427/186 |
| 2005/0167612 A1 | * | 8/2005 | Jaffer .................... | F25B 23/003 250/458.1 |

OTHER PUBLICATIONS

Granqvist, C. G. & Hjortsberg, A. Surfaces for radiative cooling: Silicon monoxide films on aluminum. Applied Physics Letters 36, 139-141 (1980). Abstract Only.
Granqvist, C. G. & Hjortsberg, A. Radiative cooling to low temperatures: General considerations and application to selectively emitting sio films. Journal of Applied Physics 52, 4205-4220 (1981). Abstract Only.
Berdahl, P., Martin, M. & Sakkal, F. Thermal performance of radiative cooling panels. International Journal of Heat and Mass Transfer 26, 871-880 (1983). Abstract Only.
Orel, B., Gunde, M. & Krainer, A. Radiative cooling efficiency of white pigmented paints. Solar Energy 50, 477-482 (1993). Abstract Only.
Suryawanshi, C. N. & Lin, C.-T. Radiative cooling: Lattice quantization and surface emissivity in thin coatings. ACS Applied Materials and Interfaces 1, 1334-1338 (2009). PMID: 20355930 Abstract Only.
Gentle, A. R. & Smith, G. B. Radiative heat pumping from the earth using surface phonon resonant nanoparticles. Nano Letters 10, 373-379 (2010). PMID: 20055479. Abstract Only.
Nilsson, Torbjorn M., Gunnar A. Niklasson, and Claes-Goeran Granqvist. "Solar-reflecting material for radiative cooling applications: ZnS pigmented polyethylene." Optical Materials Technology for Energy Efficiency and Solar Energy. International Society for Optics and Photonics, 1992.
Nilsson, T. M. & Niklasson, G. A. Radiative cooling during the day: simulations and experiments on pigmented polyethylene cover foils. Solar Energy Materials and Solar Cells 37, 93-118 (1995). Abstract Only.
Rephaeli, Eden, Aaswath Raman, and Shanhui Fan. "Ultrabroadband photonic structures to achieve high-performance daytime radiative cooling." Nano letters 13.4 (2013): 1457-1461.
Lin, Shawn-Yu, et al. "Enhancement and suppression of thermal emission by a three-dimensional photonic crystal." Physical Review B 62 (2000): 2243. Abstract Only.
Schuller, Jon A., Thomas Taubner, and Mark L. Brongersma. "Optical antenna thermal emitters." Nature Photonics 3.11 (2009): 658-661.
Greffet, Jean-Jacques. "Applied physics: Controlled incandescence." Nature 478.7368 (2011): 191-192. Abstract Only.
Narayanaswamy, Arvind, and Gang Chen. "Thermal emission control with one-dimensional metallodielectric photonic crystals." Physical Review B 70.12 (2004): 125101.

Celanovic, Ivan, David Perreault, and John Kassakian. "Resonant-cavity enhanced thermal emission." Physical Review B 72.7 (2005): 075127.
Rephaeli, Eden, and Shanhui Fan. "Absorber and emitter for solar thermo-photovoltaic systems to achieve efficiency exceeding the Shockley-Queisser limit." Optics express 17.17 (2009): 15145-15159.
Wu, Chihhui, et al. "Metamaterial-based integrated plasmonic absorber/emitter for solar thermo-photovoltaic systems." Journal of Optics 14.2 (2012): 024005.
De Zoysa, Menaka, et al. "Conversion of broadband to narrowband thermal emission through energy recycling." Nature Photonics 6.8 (2012): 535-539. Abstract Only.
Ir transmission spectra, gemini observatory (2010). URL http://www.gemini.edu/?q=node/10789.
Isaac, Marna, and Detlef P. Van Vuuren. "Modeling global residential sector energy demand for heating and air conditioning in the context of climate change." Energy Policy 37.2 (2009): 507-521.
Burdick, Arlan. Strategy guideline: accurate heating and cooling load calculations. US Department of Energy, Energy Efficiency & Renewable Energy, Building Technologies Program, 2011.
U. E. I. Administration, "Annual Energy Outlook 2012," Tech. Rep., U.S. Dept. of Energy, 2012. Preface Only—400+ page document.
Barnitt, Robb A., et al. "Analysis of off-board powered thermal preconditioning in electric drive vehicles." National Renewable Energy Laboratory, Golden, CO (2010).
Farrington, R., and J. Rugh. "Impact of vehicle air-conditioning on fuel economy, tailpipe emissions, and electric vehicle range." Earth technologies forum. 2000.
Crawley, Drury B., et al. "Energy plus: energy simulation program." ASHRAE journal 42.4 (2000): 49-56.
Deru, Michael, et al. "US Department of Energy commercial reference building models of the national building stock." (2011): 1.
Marion, William, and Ken Urban. Users manual for TMY2s: Derived from the 1961-1990 National Solar Radiation Data Base. No. NREL/SP—463-7668. National Renewable Energy Lab., Golden, CO (United States), 1995. Description Only.
Campbell, M. Charting the progress of pv power plant energy generating costs to unsubsidized levels, introducing the pv-lcoe framework. In Proceedings of the 26th European Photovoltaic Solar Energy Conference, Hamburg (Germany), 4409-4419 (2011). Abstract Only.
Keshner, M. S., and R. Arya. "Study of Potential Cost Reductions Resulting from Super-Large-Scale Manufacturing of PV Modules." Tech. Rep., Final Subcontract Report, NREL/SR-520-36846,National Renewable Energy Laboratory (2004).
Bazilian, M. et al. Re-considering the economics of photovoltaic power. Renewable Energy 53, 329-338 (2013).
2011 Buildings Energy Data Book (U.S. Department of Energy, Office of Energy Efficiency and Renewable Energy, 2011).
Greffet, Jean-Jacques, et al. "Coherent emission of light by thermal sources." Nature 416.6876 (2002): 61-64. Abstract Only.
Luo, Chiyan, et al. "Thermal radiation from photonic crystals: a direct calculation." Physical review letters 93.21 (2004): 213905.
Lee, B. J., Fu, C. J. & Zhang, Z. M. Coherent thermal emission from one-dimensional photonic crystals. Applied Physics Letters 87, 071904 (2005). Abstract Only.
Ghebrebrhan, M., et al. "Tailoring thermal emission via Q matching of photonic crystal resonances." Physical Review A 83.3 (2011): 033810.
Lenert, Andrej, et al. "A nanophotonic solar thermophotovoltaic device." Nature nanotechnology 9.2 (2014): 126-130.
Berk, Alexander, et al. "MODTRAN5: 2006 update." Defense and Security Symposium. International Society for Optics and Photonics, 2006. Abstract Only.
Jacob, Zubin, et al. "Engineering photonic density of states using metamaterials." Applied physics B 100.1 (2010): 215-218.
Tikhonravov, Alexander V., Michael K. Trubetskov, and Gary W. DeBell. "Application of the needle optimization technique to the design of optical coatings." Applied optics 35.28 (1996): 5493-5508.

(56) References Cited

OTHER PUBLICATIONS

Palik, E. Handbook of Optical Constants of Solids. Academic Press Handbook Series (Elsevier Science & Tech, 1985). Preface Only.

* cited by examiner

Side view of rooftop apparatus

SEM side profile of nanophotonic radiative cooler

RADIATIVE COOLING WITH SOLAR SPECTRUM REFLECTION

RELATED DOCUMENTS

This patent document claims benefit under 35 U.S.C. § 119 to U.S. Provisional Patent Application Ser. No. 62/001,405, entitled "Structures For Radiative Cooling" and filed on May 21, 2014, and with three Appendices; this provisional patent document and its appendixes are fully incorporated herein by reference.

BACKGROUND

Cooling demand contributes significantly to end-use of energy globally and is a major driver of peak electricity demand. Air conditioning of buildings, for example, accounts for 15% of the primary energy used to generate electricity in the United States. Passive cooling strategies that cools without any electricity input can therefore have an impact on global energy consumption. To achieve cooling, a temperature below the ambient air temperature is reached and maintained. At night, passive cooling below ambient air temperature can be achieved using radiative cooling. Radiative cooling exposes a device to the sky to radiatively emit to outer space through a transparency window in the atmosphere between 8-13 micrometer wavelength range. Peak cooling demand, however, occurs during the daytime. Daytime radiative cooling can be difficult due to heating of the device by the sun.

For buildings (and other structures), cooling is a larger issue when the temperature is higher and when the building is exposed to direct sunlight, both of which happen during daytime. Daytime radiative cooling can therefore be significantly more useful than nighttime cooling, but is also often much more challenging due to the problem of absorbed solar radiation.

SUMMARY

Aspects of the present disclosure are directed toward radiative cooling with solar spectrum reflection. In certain more specific embodiments, a structure facilitates far-field radiation at particular wavelengths while blocking radiation at solar wavelengths. Additionally, aspects of the present disclosure allow for twenty-four hour cooling of buildings and similar structures, and for cooling through a heat exchange to other liquid, gases, or solids.

Aspects of the present disclosure utilize radiative cooling techniques that exploit the natural transparency window for electromagnetic waves in the Earth's atmosphere to transport heat from terrestrial objects. These techniques can be used to facilitate passively cooling even at temperatures that are well below the ambient air temperature. Particular aspects are premised upon the recognition that the blackbody spectral radiation wavelengths for common terrestrial temperatures (0-50 degrees Celsius) are at or near wavelengths where the atmosphere is nearly transparent.

According to an embodiment, a radiative cooling apparatus for cooling an object comprises an arrangement of a plurality of different material located at different depths along a depth dimension relative to the object. The plurality of different material includes a solar spectrum reflecting portion configured and arranged to suppress light modes, thereby inhibiting coupling of the incoming electromagnetic radiation, of at least some wavelengths in the solar spectrum, to the object at a range of angles of incidence relative to the depth dimension. The plurality of different material further includes a thermally-emissive portion that includes a portion of the different material that are arranged in the depth dimension, and configured and arranged to facilitate, simultaneously with the inhibiting coupling of the incoming electromagnetic radiation, thermally-generated electromagnetic emissions from the object at the range of angles of incidence and in mid-IR wavelengths. In various embodiments, the arrangement of the plurality of different materials includes a multi-layer stack of alternating different material, wherein each layer of the multi-layer stack includes a planar layer of one of the different materials. The apparatus, in accordance with a number of embodiments, can be operated with or without sunlight (e.g., twenty-four hours a day).

Another embodiment is directed to a method that may be implemented using the above-noted apparatus. The method includes using a solar spectrum reflecting portion of an arrangement to suppress light modes and thereby prohibit coupling of incoming electromagnetic radiation, of at least some wavelengths in the solar spectrum, to the object at a range of angles of incident relative to a dimension of depth. The method further includes using a thermally-emissive portion of the arrangement to facilitate thermally-generated electromagnetic emissions from the object at the range of angles of incident and in mid-infrared (IR) wavelengths. The solar spectrum reflecting portion and the thermally-emissive portion are integrated as the arrangement formed of a plurality of material located at different depths along the depth dimension relative to the object. And, an gap (e.g., at pressure or below that of air) is at least in part surrounding the arrangement of the plurality of different material, the gap created by a sealed enclosure having an outer surface exposed to the environment and configured and arranged to create the gap between the outer surface of the enclosure and the arrangement of the plurality of different material.

Another apparatus embodiment includes an arrangement of a plurality of different material located at different depths along a depth dimension relative to an object. The plurality of material includes a solar spectrum reflecting portion and a thermally-emissive portion (that may themselves be entirely integrated along the depth dimension). The solar spectrum reflecting portion is configured and arranged to suppress light modes, thereby inhibiting coupling of incoming electromagnetic radiation, of at least some wavelengths in the solar spectrum, to the object at a range of angles of incidence relative to the depth dimension. The thermally-emissive arrangement, that includes a portion of the different material that are arranged in the depth dimension, is configured and arranged to facilitate, simultaneously with the inhibiting coupling of incoming electromagnetic radiation, thermally-generated electromagnetic emissions from the object at the range of angles of incidence and in mid-IR wavelengths. The apparatus further includes a sealed enclosure having an outer surface exposed to an environment, the sealed enclosure configured and arranged to create a gap between the outer surface of the sealed enclosure and the arrangement of the plurality of different material, and a heat exchange interface configured and arranged with the arrangement of the plurality of different material, and to conduct heat away from the object by using the radiative properties of plurality of different materials. The heat exchange interface may further interface with phase-change materials either directly or indirectly to allow for thermal storage driven by the radiative properties of the plurality of different materials.

The above discussion/summary is not intended to describe each embodiment or every implementation of the present disclosure. The figures and detailed description that follow also exemplify various embodiments.

BRIEF DESCRIPTION OF THE DRAWINGS

Various example embodiments may be more completely understood in consideration of the following detailed description in connection with the accompanying drawings.

Figure 1:
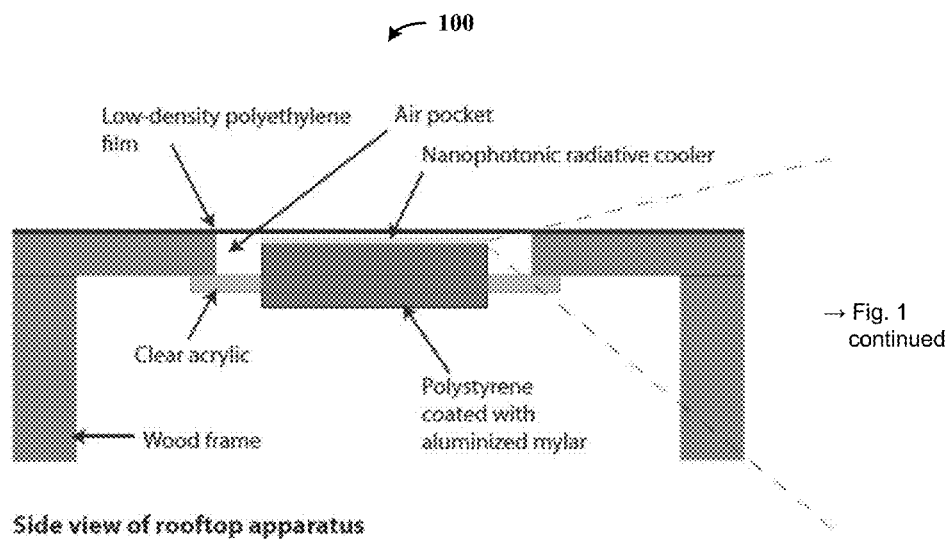
FIG. 1 shows a radiative cooling apparatus for cooling an object, in accordance with various embodiments of the present disclosure.
Figure 1:
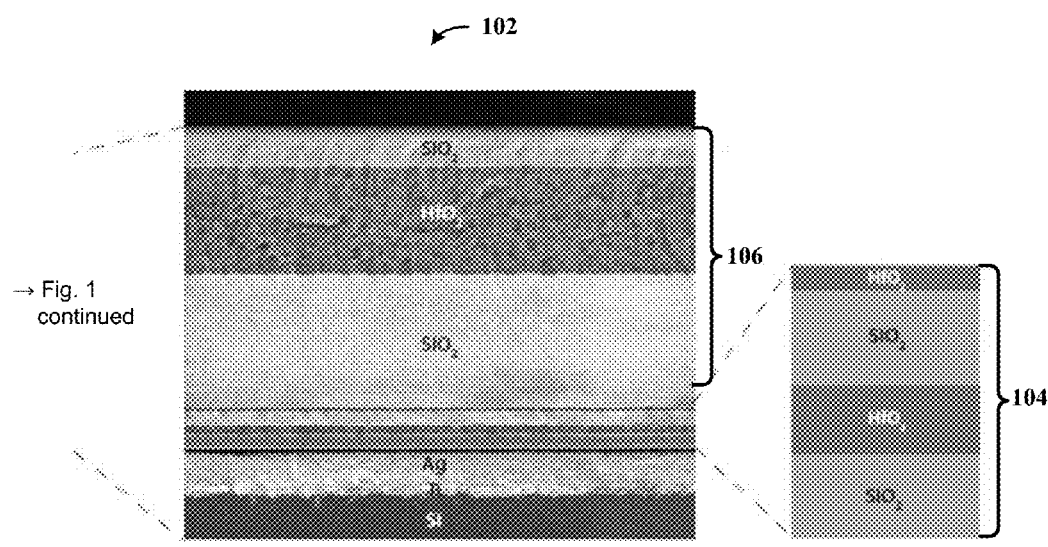

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

DETAILED DESCRIPTION

Various aspects of the present disclosure are directed towards apparatuses, methods of use, and methods of manufacturing of radiative cooling structures.

Certain aspects of the present disclosure are directed towards methods/apparatuses that include a radiative cooling apparatus for cooling an object. It has been surprisingly discovered that a plurality of different material located at different depths along a depth dimension can be used to simultaneously prohibit coupling of incoming electromagnetic radiation to an object (e.g., reflect) and facilitate thermally-generated electromagnetic emissions from the object and in the mid-infrared range wavelengths (e.g., emit). For example, the plurality of different material can be formed as an arrangement having a solar spectrum reflecting portion and a thermally-emissive portion. The solar spectrum reflecting portion is configured and arranged to suppress light propagation modes (light modes) within the structure from coupling to sources that are externally located relative to the object being cooled. The particular light modes that are suppressed can be targeted to prohibit coupling of incoming solar radiation by including at least some wavelengths in the visible, near infrared (IR), and ultraviolet spectrum (solar spectrum). The thermally-emissive portion is configured and arranged to facilitate thermally-generated emissions from the object and in mid-infrared (IR) wavelengths. The solar spectrum reflecting portion and the thermally-emissive portion are integrated as a structure (e.g., a multilayer stack of material) to both prohibit the coupling of the incoming solar spectrum to the object and facilitate the emission from the object and in mid-IR wavelengths.

Radiative cooling can include nighttime cooling, however, such cooling often has a relatively limited practical relevance. For instance, nighttime radiative cooling is often of limited value because nighttime has lower ambient air temperatures than daytime, and therefore, there is less of a need for cooling. Accordingly, aspects of the present disclosure are directed toward macroscopically planar photonic structures that selectively enhance mid-IR emission of light, specifically in the atmospheric transparency window, and also suppress absorption of light in the wavelength range of 300 nanometer (nm)-4 micrometer ($\mu$m), i.e., the solar spectral range. Such structures can be useful for a variety of applications including, but not limited to, passively cooling terrestrial structures such as buildings, homes and electronics in the daytime and the nighttime. For example, the cooling achieved by the radiative cooling apparatus, at any time of the day, can be used to cool a fluid which is then used to lower the operating temperature of an air conditioning system, or directly enter the chilled water supply of a building In particular embodiments, the structure is macroscopically planar in nature and includes layering and texturing at the nanometer to micrometer scale. Planar layers, as used herein, can include flat layers of material. For example, the planar layers may not include holes (e.g., square air rectangles). By using the planar layers, sometimes referred to as "one-dimensional nanophotonic films", a common structure (e.g., formed of the multiple layers of different material) can simultaneously reflect incoming electromagnetic radiation and emit thermally-generated electromagnets emissions from an object. For instance, the structure can include materials whose properties are given by a frequency-dependent dielectric constant and are configured to enable subwavelength interference and near-field light coupling between constituent layers so as to form spectral regions with a suppressed number of light modes. This suppression can be in the form of photonic band gaps that lead to reduced absorption of solar light. The structure can also include materials, whose properties are given by a frequency-dependent dielectric constant and are configured to enable sub-wavelength interference and near-field light coupling between constituent layers so as to form spectral regions with an enhanced number of light modes. These enhanced light modes can be used to increase the emission of light in the 8-13 μm wavelength range. There are a number of configurations and mechanisms for achieving the suppression or enhancement of light modes. A few, non-limiting examples are discussed hereafter.

To enhance the emissivity in the 8-13 μm wavelength range or in the wavelength range supported by a blackbody with temperatures in the range of 250-350 degrees Kelvin (K), a first solution uses one-dimensional nanophotonic films, to couple surface phonon-polarions or bulk lossy modes due to lattice vibration to free-space light modes. This leads to the enhanced emission of light in the 8-13 μm wavelength range or in the wavelength range supported by a blackbody with temperatures in the range of 250-350 degrees K. The enhanced emission of light is embodied in the emissivity spectrum.

According to another solution, a multi-layer stack is used that includes two or more different materials. The stack is configured to exploit a near-field coupling of light mode, and sub-wavelength interference. This allows for the enhancement of the emission of light in the 8-13 μm wavelength range or in the wavelength range supported by a blackbody with temperatures in the range of 250-350 degrees K. The enhanced emission of light is embodied in the emissivity spectrum. The multi-layer stack can include alternating layers of $SiO_2$ and at least one of $HfO_2$ and $TiO_2$ of varying thicknesses. Each layer can be a planar layer of one of the different materials.

To suppress absorption in the 300 nm-4 μm wavelength range, one solution uses a multi-layer stack consisting of two or more different materials, to exploit near-field coupling of light modes, and sub-wavelength interference, to suppress absorption of solar light (300 nm-4 μm). The suppressed absorption of light is embodied in the emissivity/absorption spectrum.

Another solution uses a layer of glass (e.g., optical glass) and a polytetrafluoroethylene (PTFE) (and/or Teflon), to exploit near-field coupling of light modes, and sub-wavelength interference, to suppress absorption of solar light (300 nm-4 μm). The suppressed absorption of light is embodied in the emissivity/absorption spectrum.

Another solution uses a layer of glass (e.g., optical glass) and a specular reflector underneath to minimize absorption of solar light (300 nm-4 μm). The specular reflector may be composed of a base layer of Ag (silver) and alternating layers of dielectric materials such as $TiO_2$ and $SiO_2$, or $Ta_2O_5$ and $SiO_2$. The specular reflector may be directly deposited via physical vapor deposition onto the glass or separately, with the glass physically placed on top of it, to allow for the combined suppression of the absorption of solar light, embodied in the emissivity/absorptivity spectrum, with the enhanced thermal emissivity enabled by the glass.

In various embodiments, a heat load of the radiative cooling device (e.g., the multi-layer stack) can be minimized using a sealed enclosure. For instance, the arrangement of the plurality of different material can be enclosed in the sealed enclosure such that the material is suspended in a sealed gap (e.g., a pocket that is sealed from a surrounding environment and is at a pressure at or below ambient air pressure). Using the enclosure, no surface of the plurality of different material that is in immediate contact with the gap or the sample will itself heat up due to solar irradiance. It has been surprisingly discovered, that devices in accordance with the present disclosure, can result in a drop from ambient air temperature even in the presence of direct sunlight.

Turning now to the figures, FIG. 1 shows a radiative cooling apparatus for cooling an object, consistent with embodiments of the present disclosure. The radiative cooling apparatus is shown as a side view 100 and also a close up view 102 of the plurality of different material of the cooling apparatus. In particular, a metal layer (e.g., the metallic (Ag) portion) of the structure shown in the close up view 102 can be placed in thermal contact with the object being cooled (the contact at least thermally contacting, but also can be physically contacting). The apparatus can be used to exchange cooling between the plural of different material and other liquids, gasses or solids (e.g., air, water or a mix of water and ethylene glycol) while minimizing ambient heating of the radiative cooling apparatus. The opposite/top portion of the apparatus (polyethylene film) can be exposed to sunlight and also to the atmosphere and paths for radiating thermal energy.

The plurality of different material, in various embodiments, can be formed as an arrangement. For example, arrangement of the plurality of different materials can be located at different depths along a depth dimension (and relative to the object). The depth dimension can be formed by the layers of material, each layer at a different depth and the stacking of multiple layers forming the depth dimension. Further, the depth dimension can be relative to the object and/or relative to a direction of inhibiting coupling of the incoming electromagnetic radiation and thermally-generated electromagnetic emissions. For example, the object can be located beneath the arrangement. The depth dimension can be relative to (the direction of) the inhibiting coupling of the incoming electromagnetic radiation to the object (by the solar spectrum reflecting portion) and the thermally-generated electromagnetic emissions from the object (by the thermally-emissive portion).

In some embodiments, the arrangement can include a multi-layer stack of material. The multi-layer stack can include two or more different materials. For example, the two or more materials can be layered in flat layers located at the different depths in the depth dimension (e.g., the depth dimension is formed by the different layers located at different depths relative to an object). In some embodiments, the two or more material can alternate in the multi-layer stack. For example, the multi-layer stack can include the two or more materials integrated as a constitution, and is sometimes herein referred to as "a nanophotonic radiative cooler". The arrangement of the plurality of different material is configured and arranged to simultaneously prohibit (or significantly mitigate) coupling of incoming electromagnetic radiation to the object at a range of angles of incident (e.g., a first direction) relative to the depth dimension and also facilitate the thermally-generated electromagnetic emissions from the object at the range of angle of incident and in the mid-IR wavelengths. Thereby, the arrangement of the plurality of different material can simultaneously reflect at least some wavelengths and emit at least some mid-IR wavelengths from the object at the same range of angles of incident relative to the depth dimension. The range of angles of incident can be a direction toward the sky and/or away from the ground.

As previously discussed, the arrangement plurality of different material (e.g., the nanophotonic radiative cooler), in some embodiments, can include alternating layers of material forming a multi-layer stack. For example, the alternating layers, as illustrated by the close up view 102, can include alternating layers of $HfO_2$ and $SiO_2$ of varying thicknesses. Alternatively, although the not illustrated by FIG. 1, the alternating layers can include alternating layers of $TiO_2$ and $SiO_2$. In various embodiments, the multi-layer stack can be less than 50 millimeters thick.

In various embodiments, the plurality of different material can include a solar spectrum reflecting portion 104 (e.g., structure) and a thermally-emissive portion 106 (e.g., structure). The solar spectrum reflecting portion 104 can suppress light modes. For example, the solar spectrum reflecting portion 104 can inhibit coupling of incoming electromagnetic radiation, of at least some wavelengths in the solar spectrum to the object at a range of angles of incident relative to the depth dimension. The wavelengths in the solar spectrum can include visible spectrum, near IR, and/or ultraviolet spectrum. The thermally-emissive portion 106 (that includes a portion of the different materials arranged in the depth dimension) can facilitate, simultaneously with the inhibiting coupling of the incoming electromagnetic radiation, thermally-generated electromagnetic emissions from the object at the range of angles of incident and in the mid-IR wavelengths.

FIG. 1 illustrates embodiments in which the solar spectrum reflecting portion and the thermally-emissive portion that include layers of the different material that are located in a physically separate location along the depth dimension. Thus, each of the reflecting and emissive portions can include a distinct set of materials (or layers), with each set of materials being located at a different depth along the depth dimension. In a number of embodiments, the solar spectrum reflecting portion and the thermally-emissive portion can (partially or completely) overlap in the depth dimension. For example, in some embodiments, both the solar spectrum reflecting portion and the thermally-emissive portion can include the same set of materials (or layers) of the different material (e.g., all layers) and the collective properties of the plurality of layers can achieve both the solar reflective behavior and the thermally emissive behavior.

In certain embodiments, a part of the solar spectrum reflecting portion and the thermally-emissive portion can overlap in the depth dimension, while other parts of the two portions do not overlap. For instance, a first portion of the plurality of layers contributes to solar reflection, but not thermal emission. A second portion contributes to both solar reflection and thermal emission. A third portion contributes to thermal emission but not solar reflection. In such instance, the second portion represents an overlap where the corresponding material is part of both the solar reflection portion and the thermal emission portion.

As illustrated by the close up view 102, the multi-layer stack can include seven alternating layers of material. For example, the solar spectrum reflecting portion 104 can include four layers of $HfO_2$ and $SiO_2$ (or $TiO_2$ and $SiO_2$) that are sub-100 nm at the bottom of the seven alternating layers, along with the Ag layer. The solar spectrum reflecting portion 104 can be responsible for thermal radiation from the arrangement of the plurality of material (e.g., the nanophotonic radiative cooler), through a combination of material properties and interference effects. $SiO_2$ has a strong peak in its absorptivity near 9 micrometers due to its phonon-polariton resonance. $HfO_2$ can present a non-zero absorption and hence emissions in the 8-13 micrometers wavelengths.

The thermally-emissive portion 106 can include the three layers of $HfO_2$ and $SiO_2$ that are thicker than the layers forming the solar spectrum reflecting portion 104. The thermally-emissive portion 106 can also assist in optimizing solar reflection, and thus, FIG. 1 is an example of an embodiment where the plurality of materials and layers along the depth dimension can achieve both the solar spectrum reflecting behavior and the thermally emissive behavior at the same time, and there is an overlap between the solar spectrum reflecting portion 104 and the thermally-emissive portion 106. These layers can assist in solar reflection in a manner akin to that achievable using periodic one-dimensional phonic crystals. $HfO_2$ can, for example, serve as a high-index material that presents low ultra-violet absorption, which can be useful for optimizing solar reflectance. $SiO_2$ can be optically transparent and is the low-index layer.

For example, the plurality of different material can absorb light from 300 nanometers (nm) to 4 micrometers (μm) and reflect at least 90% of solar power at incidence. Incidence, as used herein, can include incident solar power at near-normal incidence. In various embodiments, the plurality of different material can reflect up to 97% of solar power at incidence.

As illustrated by the side view 100, an air or vacuum gap can at least in part surround the arrangement of the plurality of different material (e.g., the radiative cooler). The radiative cooling apparatus can include, in such embodiments, a sealed enclosure that has an outer surface exposed to the environment (e.g., air, wind, precipitation, sunlight, etc.). For example, the sealed enclosure can surround the arrangement of the plurality of different material and can create the gap between the outer surface of the sealed enclosure and the arrangement of the plurality of different material.

The sealed enclosure can include various materials that can isolate (and/or insulate) the plurality of different material from the environment and can create a (sealed) gap. For example, the enclosure can include a layer (e.g. coating) of polystyrene with aluminized Mylar™ at the bottom of the multi-layer stack, acrylic, and/or and the outer surface exposed to the environment that is formed of a polyethylene film that creates the gap. The gap can itself be at the same pressure as ambient air pressure, or be at a lower pressure, as one might obtain using a vacuum pump. For example, the arrangement of the plurality of different material can be placed on a polystyrene pedestal which is supported by a clear acrylic box. The clear acrylic box can be supported by a support structure, such as a wood frame. A clear polyethylene film (e.g., the outer surface exposed to the environment) can be placed on top of the arrangement of the plurality of different material. In various embodiments, the polyethylene film can be 12.5 micrometers thick and can cover the plurality of different material to form the gap. The outer surface that is exposed to the environment can function as an IR-transparent wind shield. Thereby, the arrangement of the plurality of different material can be suspended in a sealed gap (e.g., a pocket of gas at or below ambient air pressure). Further, no surface in immediate contact with the gap or the sample will heat up due to solar irradiance.

The plurality of different material, which can be configured and arranged to enhance emissivity that is useful for radiative cooling, can further suppress absorption of at least some wavelengths in the solar spectrum. For instance, the enhanced emissivity can be within the range of 8-13 μm where the atmosphere is substantially transparent. This type of structure has been found to be useful for strong emissivity over a broad range of angles of incidence (e.g., 0-80 degrees).

Immediately below the seven layers of alternating materials includes Ag, Ti, and Si. The Ag can be 200 micrometers thick, the Ti can be 20 micrometers thick, and the Si can be 750 micrometers thick. The Ti layer can include an adhesion layer and the Si layer can be a wafer substrate. The plurality of different material is designed to suppress the absorption of solar light throughout the solar spectrum. For instance, these layers can create photonic band gaps that prevent solar light from propagating through the structure.

Although the embodiment of FIG. 1 illustrates the arrangement plurality of different material as planar layers, embodiments are not so limited. For example, the arrangement of the plurality of different material can be an integrated arrangement with distribution of the solar spectrum reflecting arrangement and the thermally-emissive arrangement throughout the arrangement in at least one of a width and a length dimension relative to the depth dimension. For example, the different material can be located at different depths along the depth dimension relative to the object and at different width and/or lengths dimensions relative to the depth dimension (e.g., different width, length, and/or depth dimensions).

The particular materials and thicknesses can be varied and still provide the ability to enhance or suppress the relevant light modes in a single integrated arrangement/stack as shown in FIG. 1. The use of a single integrated arrangement can be particularly useful for avoiding problems stemming from a solution that might use multiple different components separated by significant physical distances and not integrated into a single structure. For instance, a reflective covering foil placed over a radiative structure can complicate the total cooling system to the point of severely limiting its versatility of application and durability (e.g., a covering foil might range in thickness from several microns to a fraction of a millimeter, and a compromise between IR transmission and solar reflection may lead to undesirable consequences). Further, the particular materials can be one-dimensional nanophotonic films that do not require photolithography (e.g., patterning) and can be more amendable to large-scale fabrication as compared to two-dimensional photonic crystals. And, the enclosure forming the gap can minimize the heat load on the plurality of different material. The heat load reduction can include both convection and conduction to the radiative cooling apparatus under peak solar irradiation.

Further, the radiative cooling apparatus, in accordance with the present disclosure, can reduce a temperate to below the ambient air temperature. The reduction, in various embodiments, can be approximately 4-5 degrees C. below or more, even if solar irradiance is already incident on the object. That is, surprisingly, the surface temperature is decreased from the ambient air temperate when removed from the shade and exposed to sun during the day. Such an apparatus can be used for a passive, and potentially water-free, approach to cooling objects, such as buildings and vehicles, at all hours of the day. The radiative cooling device can, for example, provide radiative cooling exceeding 20 Watts (W)/meter (m)$^2$ at an ambient air temperature of 300 degrees K with an equivalent of direct sunlight striking the device.

The radiative cooling apparatus, in accordance with various embodiments, can be operated with or without sunlight (e.g., twenty-four hours a day). That is, the apparatus can be used to provide cooling resources at all hours of the day. For example, during hours of the day without sunlight (e.g., night-time), the plurality of different material (e.g., the thermally-emissive portion) facilitates thermally-generated electromagnetic emissions from the object and in mid-IR wavelengths. Additionally, during hours of the day with sunlight (e.g., daytime), the plurality of different material (e.g., the solar spectrum reflecting portion and the thermally-emissive portion) simultaneously prohibits coupling of incoming electromagnetic radiation to an object and facilitate thermally-generated electromagnetic emissions from the object and in the mid-IR wavelengths.

For example, radiative cooling apparatus can be used for cooling terrestrial structures such as buildings, automobiles and electronic devices where heat management is an issue, consistent with embodiments of the present disclosure. Various embodiments can provide a passive way of cooling such structures, which can be useful for dramatic energy savings. For instance, experimental testing supports that the performance by the daytime radiative cooler can be at least: $P_{cooling}(T_{ambient})$=50 W=m$^2$ at $T_{ambient}$=300 degrees K.

In comparison, solar panels that operate at 20% efficiency can generate less than 200 W/m$^2$ at peak capacity. In certain conditions, the passive daytime radiative coolers proposed here could be thought of as solar panel substitutes (or supplements) that reduce the demand on a rooftop solar system by reducing the need for air conditioning (cooling) systems.

As a non-limiting estimate of the building-level energy impact of such a radiative cooling apparatus, the effect of a passively cooling rooftop in the daytime on the building's air conditioning needs can be modeled as follows: 1) a peak cooling load of approximately 6 (kilowatt) kW (e.g., in Chicago and Orlando) for canonical 2233 feet one-story homes and 2) the radiative cooler is operating at its peak cooling rate. For 40 m$^2$ of daytime radiative cooling apparatus on the rooftop (20% of a total of 200 m$^2$ available rooftop space), 32% of the house's air conditioning needs can be offset during the hottest hours of the day.

Reducing the air conditioning load at peak hours can be particularly useful for reducing the grid's overall need for dirty 'peak-power' sources that kick in to cover extra power needs in the summer. Moreover, such radiative cooling apparatuses can reduce overall energy demands from commercial buildings such as factories, warehouses and data centers, lending a significant hand to the nation's energy efficiency goals. Air conditioning alone is believed to represent 23% of the power usage of residential and commercial buildings, or 16.33% of the total electric power usage of the United States as of 2011. A 10% reduction in air conditioning needs system wide via thorough implementation of daytime radiative cooling structures would thus represent a 1.6% reduction in the total electric power usage of the country, or 61.7 terawatt-hours (TWh). This would be equivalent to reducing the need for 7 gigawatts (GW) of power generating capacity overall.

Accordingly, automobiles represent another area where cooling energy costs can be reduced with a daytime radiative cooler. Although all vehicles could potentially benefit, electric vehicle (EV) battery range could benefit greatly from a reduction of air conditioning needs. It is believed that air-conditioning can reduce an EV's charge depletion range by up to 35%. Experimental modeling suggests that an air conditioning load of 1000 W for small cars could then be reduced 10% by covering 2 m$^2$ of the car's surface.

Another potential application is for extra-terrestrial cooling. In outer space, radiation is the dominant mechanism of heat exchange and temperature regulation. A device operating in space (e.g., orbiting satellite, spaceship or landing probe) which produces heat has the potential to benefit from the use of a radiative cooling structure that would allow it to cool more efficiently and/or obtain a pre-specified equilibrium temperature.

Consistent with experimental examples discussed herein, assuming a radiative cooling apparatus is operating at its peak cooling rate, then 40 m² of daytime radiative cooling apparatus on the rooftop (20% of a total of 200 m² available rooftop space), one can offset 32% of a house's air conditioning needs during the hottest hours of the day.

Figure 2:
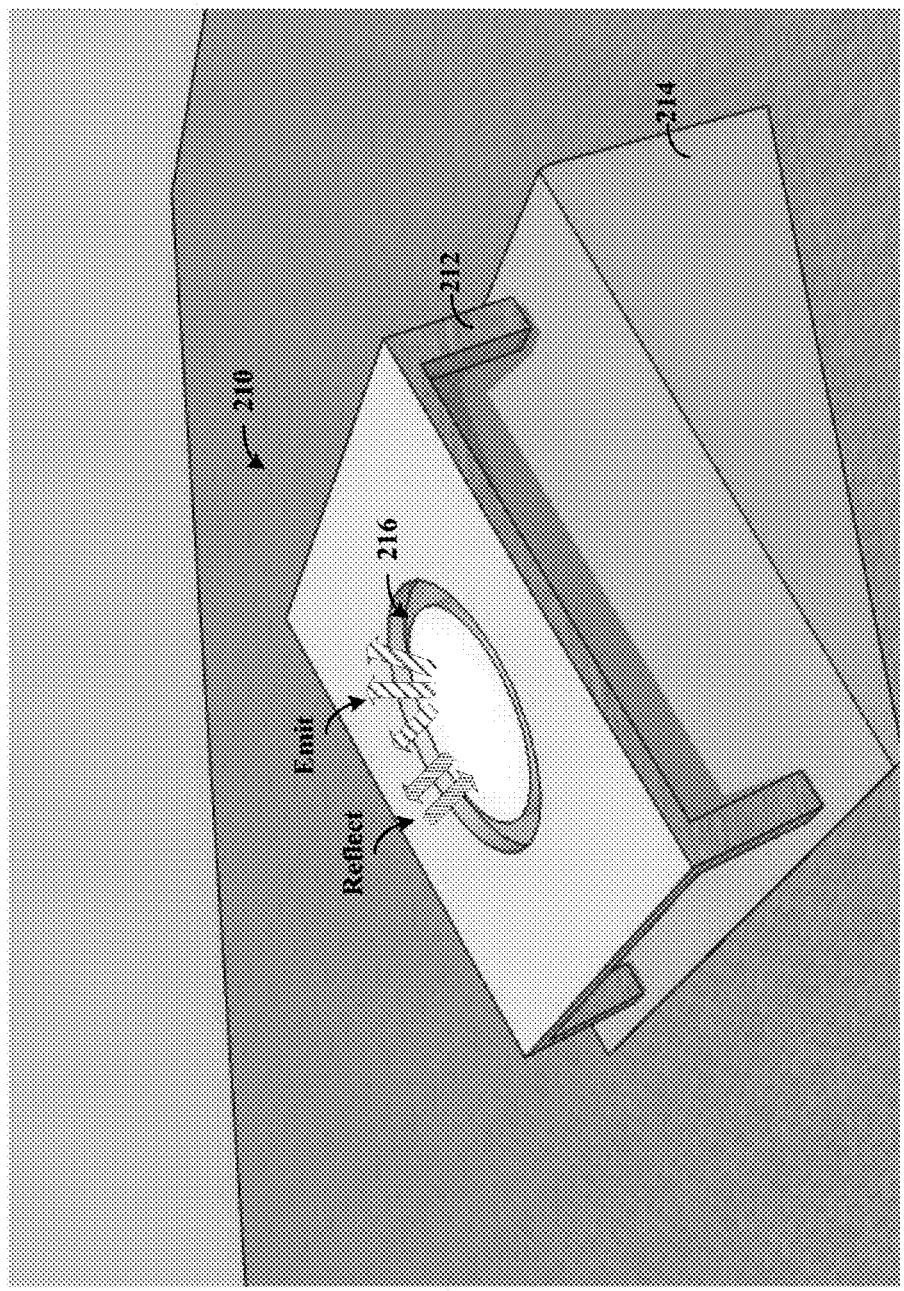
FIG. 2 shows a radiative cooling apparatus at an angle for cooling an object, in accordance with various embodiments of the present disclosure.

FIG. 2 shows a radiative cooling apparatus 210 at an angle for cooling an object, consistent with embodiments of the present disclosure. To take advantage of arrangement of the plurality of different material (e.g., the multi-layer stack) and associated advantages, the radiative cooling apparatus 210 can be placed within (or on) a variety of different support structures 212, 214. Two such structures are shown in FIG. 2. One of the structure can include a wedge block or box 214. This type of support structure can allow the plurality of different material to be at an angle. This can be particularly useful for situations where the surface of the object is used for other purposes. Consistent with various embodiments, the support structure 212, 214 can be configured for portability so as to allow for simple installation and removal.

As illustrated by FIG. 2, one of the support structure can include a frame 212 covered by a layer of aluminized Mylar™. The top surface of the frame 212 can have a circular aperture 216 (e.g., a 10-inch aperture). A clear acrylic box with a top side open can be joined and sealed to the underside of the frame's 212 top surface. An aluminized Mylar™-coated polystyrene pedestal can be inserted through the acrylic box and the plurality of different material (e.g., the radiative cooler) can be placed on the polystyrene. A polyethylene film can be sealed to the top of the circular aperture 216 on the frame 212 and serve as the IR-transparent wind shield. The support structure 212 can create the sealed gap around the plurality of different material. Surfaces that are in contact with the gap (e.g., pocket of gas) can absorb sunlight minimally, thus, minimizing the heat load on the plurality of different material due to external heating of adjacent surfaces and air.

Moreover, the support structure 212, 214 can include adjustable elements (e.g., a rotational support portion) that allow the radiative cooling device to be optimally oriented. In some instances, the orientation can be adjusted for different times of day or even different times of the year. For example, the radiative cooling apparatus can be uninstalled or oriented to reduce cooling when the ambient temperature is below a threshold value, as may occur during certain times of the year or simply during a cold front. Other possibilities include the use of such structures for cooling of temporary structures (e.g., temporary buildings for large events) or use on mobile structures while motionless and removed during motion (e.g., to avoid damage due to wind shear or objects that might strike the cooling structure during movement).

In various embodiments, at least portions of the support structures 212, 214 can be shaded from direct sunlight. For example, the support structures 212, 214 (e.g., the sealed enclosure) can include a layer of shading material, with the exception the plurality of material, to prevent and/or minimize heat up from sunlight exposure to the object.

Figure 3:
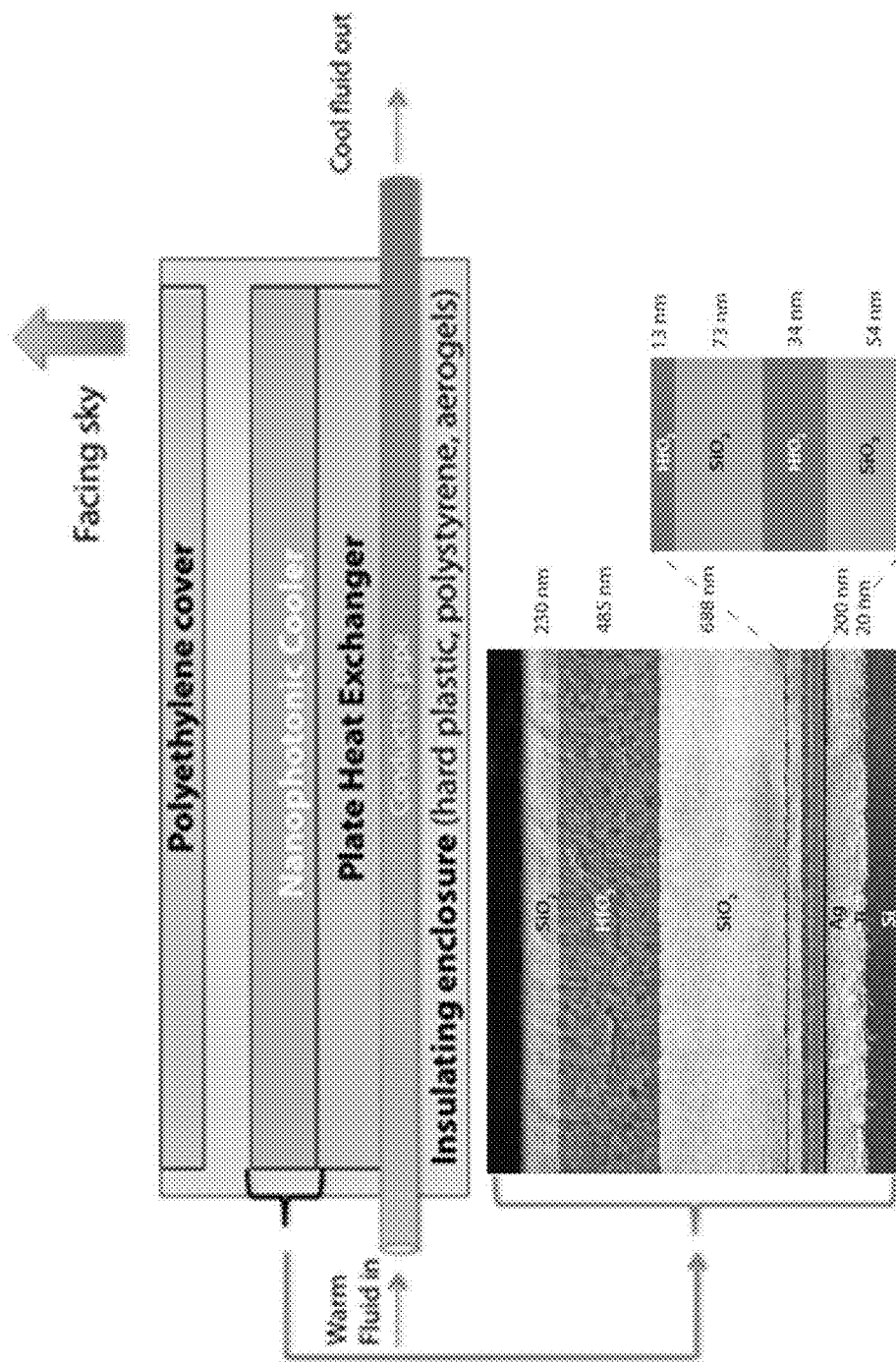
FIG. 3 shows an alternative configuration for providing cooling for various structures, in accordance with various embodiments of the present disclosure.

FIG. 3 shows an alternative configuration for providing cooling for various structures, consistent with embodiments of the present disclosure. As illustrated, the arrangement of the plurality of different material, as illustrated and described by FIG. 1, can be integrated into a system. The system and/or device can include the arrangement of the plurality of different material in an enclosure (e.g., the polyethylene film configured and arranged as a cover over an insulating enclosure that, in various embodiments, is formed of hard plastic, polystyrene, aerogels, etc.) As illustrated, the arrangement of the plurality of different material (e.g., nanophotonic radiative cooler) includes multiple alternating layers of material that collectively reflect sunlight and selectively emit thermal radiation.

The system/device can further include a heat exchange interface that includes various structures. A heat exchange interface can cool a building structure and/or interval devices. For example, the heat exchange interface can conduct/convect heat away from the internals of the building to the roof. In various embodiments, the structure of the heat exchange interface can include a conductive pipe and a plate heat exchanger. The conductive pipe can pass liquid and the plate heat exchanger can be arranged with the arrangement of the plurality of different material and the conductive pipe to cool liquid passing through the conductive pipe to conduct heat away from an object.

For instance, liquid (e.g., water) can be cycled through the system and used to cool the building and/or internal components, such as racks of servers. When the liquid reaches the arrangement of the plurality of different material it cools through passive radiation. The plate heat exchanger can cool fluid that is within the conductive pipe from a temperature (e.g., such as, from a temperature at or above ambient air temperature to below ambient air temperature). A heat pump (or similar device) can be used to further increase the cooling capabilities of the system.

As illustrated and previously discussed, in various embodiments, the arrangement of the plurality of different material includes a metal layer. The metal layer can be in thermal contact with at least a portion of the heat exchange interface to effect a temperature of the at least portion of the heater exchanger. The portion, in some embodiments, can include the plate heat exchanger. For example, the plate heat exchanger can be in thermal contact with at least a portion of the arrangement the plurality of different material (e.g., the metal layer) to have a temperature that corresponds with the temperature of the plurality of different material. In various embodiments, the temperature of the plurality of different material is below ambient air temperature, as previously discussed.

Figure 4A:
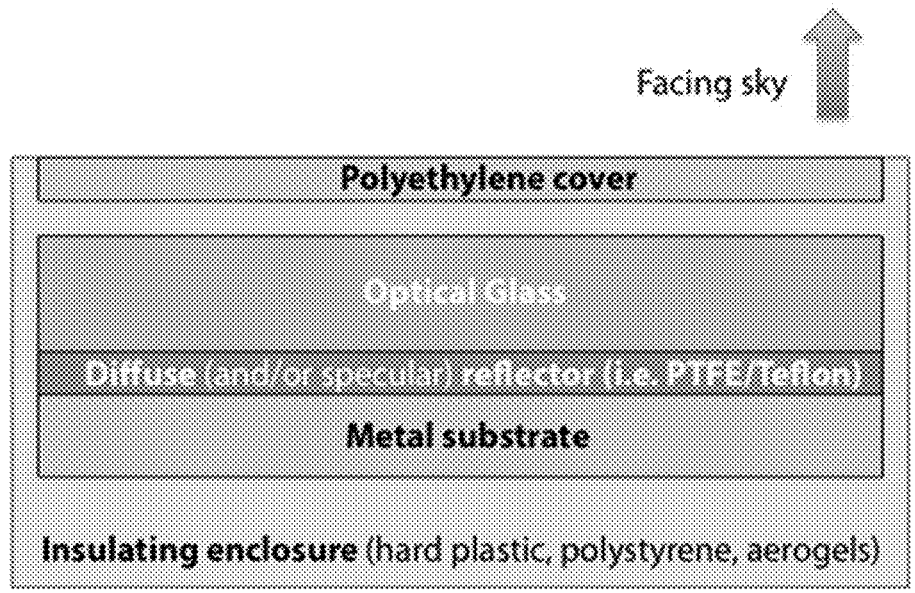
FIGS. 4A-4B show alternative configurations of a radiative cooling apparatus, in accordance with various embodiments of the present disclosure.
Figure 4B:
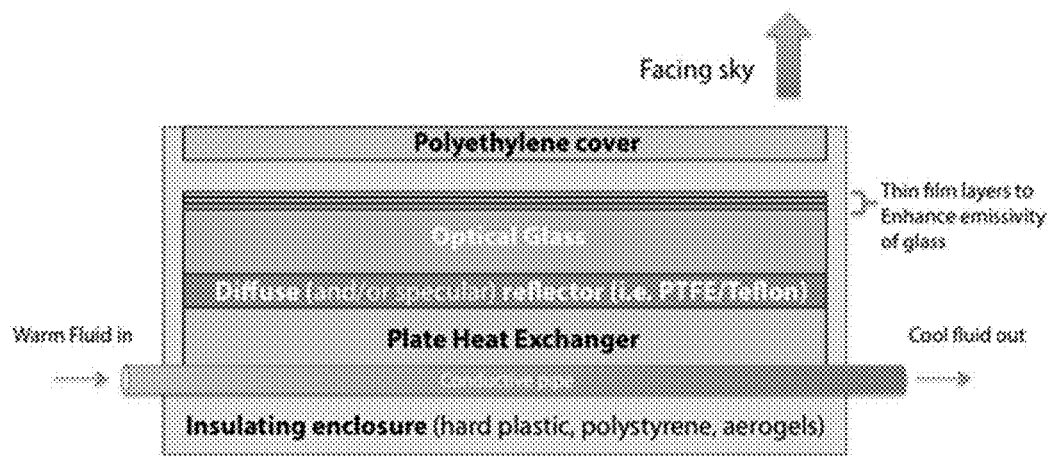

FIG. 4A-4B shows an alternative configuration of a radiative cooling apparatus, consistent with embodiments of the present disclosure. For example, FIGS. 4A-4B illustrates an embodiment in which the thermally-emissive portion of the radiative cooling apparatus is formed of a layer of optical glass. The optical glass layer can be transparent (substantially) in the visible wavelength range. Example optical glass material can include borosilicates (BK7, B270, and Crown glass) and fused silica. Further, the solar spectrum reflecting portion of the radiative cooling apparatus is formed of polytetrafluoroethylene (PTFE) (and/or Teflon). The solar spectrum reflecting portion, in such embodiments, can include a diffuse white reflector.

The radiative cooling apparatus (e.g., optical glass and PTFE) can be packaged in a sealed enclosure. As previously discussed, the sealed enclosure can include plastic, polystyrene, and/or aerogels, among other materials with an IR-transmissive top window (e.g., polyethylene) to minimize heating of the plurality of different material by solar radiance.

FIG. 4B illustrates various additional and/or alternative features of the radiative cooling apparatus illustrated by FIG. 4A. For example, in various embodiments, a plurality of layers can be added to the optical glass layer to improve the emissivity and cooling power of the structure. An example layer can include a micron or nano-scale layer of $TiO_2$ followed by a micron-scale layer of $SiO_2$ to provide emissivity in the dip (e.g., as illustrated by FIG. 2 of Appendix B) near 9 microns. Alternatively, the optical glass can be patterned for impedance matching that facilitates near-ideal emissivity at all thermal wavelengths. For example, this can be achieved using photolithography and dry/wet etching, and/or a chemical process.

Further, as illustrated by FIG. 4B, a plate heat exchanger can be attached below the solar spectrum reflecting portion of the plurality of different material. Thus, liquid can flow through a conductive pipe and be cooled by the radiative cooling apparatus, as previously described in connection with FIG. 3.

Figure 5:
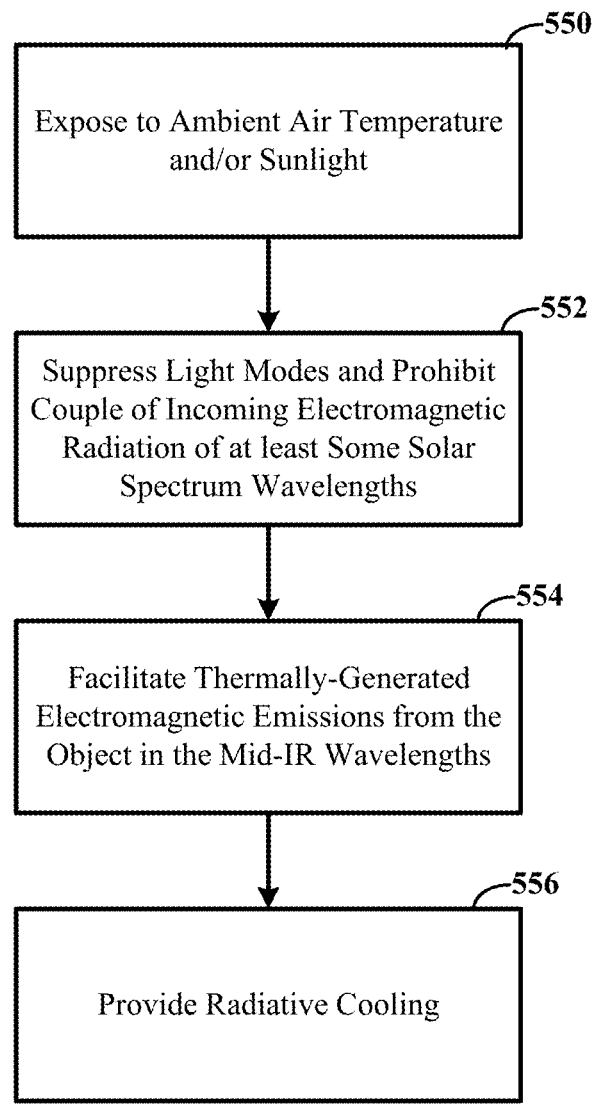
FIG. 5 shows an example method of cooling an object using a radiative cooling apparatus, in accordance with various embodiments of the present disclosure.

FIG. 5 shows an example method of cooling an object using a radiative cooling apparatus, consistent with embodiments of the present disclosure. At block 550, the radiative cooling apparatus can be exposed to the ambient air temperature, and, in some embodiments, sunlight.

At block 552, using a solar spectrum reflecting portion of an arrangement, light modes can be suppressed and thereby prohibit coupling of incoming electromagnetic radiation, of at least some wavelengths in the solar spectrum, to the object at a range of angles of incident relative to a depth dimension. At block 554, using a thermally-emissive portion of the arrangement, thermally-generated electromagnetic emissions can be facilitated, simultaneously with the prohibit of coupling of incoming electromagnetic radiation, from the object at the range of the angles of incident and in mid-infrared (IR) wavelengths.

As previously discussed, the solar spectrum reflecting portion and the thermally-emissive portion can be integrated as the arrangement of a plurality of material located at different depths along a depth dimension relative to the object. Further, a gap is at least in part surrounding the arrangement of the plurality of different material. The gap is created by a sealed enclosure having an outer surface exposed to the environment. The sealed enclosure creates the gap between the outer surface of the enclosure and the arrangement of the plurality of different material. The gap (e.g., sealed pocket of gas at or below ambient air pressure) can prevent and/or minimize heat increases to a temperature corresponding with the plurality of different material of the radiative cooling apparatus from exposure to the solar radiance.

At block 556, the method can include providing radiative cooling to the object. The provided radiative cooling can be of at least 20 W/m² at an ambient air temperature of 300 degrees K and with an equivalent of direct sunlight striking the solar spectrum reflecting portion and the thermally-emissive portion. Further, in various embodiments, providing the radiative cooling can include providing a temperature using the plurality of different material that is at least 4-5 degrees C. below ambient air temperature while the plurality of different material is in direct sunlight.

Embodiments of the present disclosure are directed toward these and other mechanisms for passively cooling structures even in extremely hot environments. This can be useful for cost and energy savings over the lifetime of buildings and other structures or objects.

Experimental Results and Various Embodiments

To achieve cooling, a temperate below ambient air temperature is reached and maintained. At night, passive cooling below ambient air temperature can be achieved using radiative cooling. Radiative cooling exposes an apparatus to the sky to radiatively emit to outer space through a transparency window in the atmosphere between 8-13 μm wavelength range. Peak cooling demand, however, occurs during the daytime. Daytime radiative cooling can be difficult due to heating the apparatus by the sun. However, using various embodiments, radiative cooling apparatuses during the day can achieve a cooling of nearly 5 degrees C. (or more) below the ambient temperature under direct sunlight.

As previously discussed, various radiative cooling apparatuses include an arrangement of a plurality of different materials located at different depths along a depth dimension relative to an object. The plurality of material is configured to simultaneously reflect incoming electromagnetic radiation and emit thermally-generated electromagnetic emissions. The plurality of different material can be formed as the arrangement and can having a solar spectrum reflecting portion (e.g., a reflector) and a thermally-emissive portion (e.g., an emitter). In some embodiments, the arrangement of the plurality of different material can include multiple alternating layers of material that can reflect up to 97% of incident sunlight while emitting strongly and selectively in the atmospheric transparency window. For example, when the plurality of different material is exposed to direct solar irradiance of greater than 850 W/m² on a roof top, the plurality of different material can achieve 4.9 degrees C. below ambient air temperature and have a cooling power of 40.1 W/m² at ambient. Thus, such a plurality of different material can allow for energy efficiency and can be used as a renewable thermodynamic resource, even during the hottest hours of the day.

For example, consider an arrangement of a plurality of different material of an area A at temperature T, whose spectral and angular emissivity is $\varepsilon(\lambda, \theta)$. When the plurality of different material is exposed to a daylight sky, it is subject to both solar irradiance and atmospheric thermal radiation corresponding to ambient air temperature $T_{amp}$. The net cooling power $P_{cool}$ of such a plurality of different material is:

$$P_{cool}(T)=P_{rad}(T)-P_{atm}(T_{amb})-P_{sun}-P_{cond+conv} \quad \text{(Equation 1)}.$$

For example, in Equation 1, $$P_{rad}(T)=A\int d\Omega \cos\theta \int_0^\infty d\lambda I_{BB}(T,\lambda)\varepsilon(\lambda,\theta) \quad \text{(Equation 2)},$$

is the power radiated out by the structure. Here $\int d\Omega = 2\pi \int_0^{\pi/2} d\theta \sin\theta$ is the angular integral of a hemisphere.

$$I_{BB}(T, \lambda) = \frac{2hc^2}{\lambda^5} \frac{1}{e^{hc/(\lambda k_B T)} - 1}$$

is the spectral radiance of a blackbody at a temperature T, where h is Planck's constant, $k_B$ is the Boltzmann constant, c is the speed of light, and $\lambda$ is the wavelength. Further:

$$P_{atm}(T_{amb})=A\int d\Omega \cos\theta \int_0^\infty d\lambda I_{BB}(T_{amb},\lambda)\varepsilon(\lambda,\theta)\varepsilon_{atm}(\lambda, \theta) \quad \text{(Equation 3)},$$

is the absorbed power due to incident atmospheric thermal radiation, and $$P_{sun}=A\int_0^\infty d\lambda \varepsilon(\lambda,\theta_{sun})I_{AM1.5}(\lambda) \quad \text{(Equation 4)}$$

is the incident solar power absorbed by the structure. Equation 3 and 4 can be arrived at using Kirchhoff's radiation law to replace the arrangement's absorptivity with its emissivity $\varepsilon(\lambda, \theta)$. The angle dependent emissivity of the atmosphere is given by $\varepsilon_{atm}(\lambda, \theta)=1-t(\lambda)^{1/\cos\theta}$, where $t(\lambda)$ is the atmospheric transmittance in the zenith direction. In Equation 4, the solar illumination is represented by $I_{AM1.5}(\lambda)$, the air mass (AM) 1.5 spectrum. For example, assume that the arrangement is facing the sun at a fixed angle $\theta_{sun}$. The term $P_{sun}$ does not have an angular integral, and the arrangement's emissivity is represented by its value at $\theta_{sun}$. For example, $$P_{cond+conv}(T,T_{amb})=A \cdot h_c (T_{amb}-T) \quad \text{(Equation 5)}$$

is the power lost due to convection and conduction. $h_c=h_{cond}+h_{conv}$ is a combined non-radiative heat coefficient and captures the collective effect of conductive and convective heating due to contact of the plurality of different material with external surfaces and air adjacent to the plurality of different material of the radiative cooling apparatus. Such surfaces may, in various embodiments be at or above ambient air temperature (e.g., such as when they are on a roof).

Equation 1, in general, relates to the cooling power $P_{cool}(T)$ of the surface, i.e., the net power outflow of the surface, as function of its temperature. The surface, as used herein, can include the arrangement of the plurality of different material (e.g., the solar spectrum reflecting portion and the thermally-emissive portion). Such a surface can be used as a daytime radiative cooling apparatus if there is a net positive power outflow when $T=T_{amb}$ under direct sunlight, i.e., it radiates more heat out to space than heat it gains by absorbing sunlight and atmospheric thermal radiation. The power outflow $P_{cool}(T=T_{amb})$ then defines its cooling power at ambient air temperature. In the absence of net outflow, a radiative cooling apparatus' temperature can reach an equilibrium temperature below ambient. The solution of Equation 1 with $P_{cool}(T)=0$ defines the equilibrium temperature $T_{eq}$. Ideally, a daytime radiative cooling apparatus, in accordance with the present disclosure, demonstrates an equilibrium temperature $T_{eq}<T_{amb}$, and the cooling power as a function of T under direct sunlight can be measured, corresponding to peak daytime conditions.

To achieve daytime radiative cooling, the radiative cooling apparatus minimizes $P_{sun}$, and therefore reflects over visible and near-IR wavelength ranges. Further, the radiative cooling apparatus emits thermal radiation $P_{rad}$ while minimizing incident atmospheric thermal radiation $P_{atm}$ by minimizing its emission at wavelengths where the atmosphere is opaque. Therefore, the apparatus emits selectively when the atmosphere is transparent, between the 8 and 13 µm wavelength range, and reflects at all other wavelengths. Such constraints are formidable and fundamentally thermodynamic in nature. Radiative power scales $T^4$, and the sun, at 5777 K, far outstrips the radiation of room-temperature objects on Earth, which are typically around 300 K. Even with an ideally selective emitter that only emits in the atmospheric transparency window, over 90% of incident sunlight should be reflected in order to remain at ambient room temperature. In practice, to achieve meaningful daytime radiative cooling, a plurality of different material of a radiative cooling apparatus may reflect more than 94% of sunlight. This can be particularly challenging when combined with the goal of emitting selectively in the atmospheric window. Prior metallic reflectors and conventional thermal emitters with reflective cover foils have not yet been able to achieve cooling under direct sunlight. Additionally, the plurality of different material is sealed from its environment to minimize $h_c$ and in turn $P_{cond+conv}$. This constraint can present challenges as, during the daytime, many surfaces are in contact with the plurality of different material and will themselves heat up when exposed to sunlight. This heat can transfer to the plurality of different material.

Prior designs that include a nanophotonic structure use complex two-dimensional photonic crystals that require photolithography. However, embodiments in accordance with the present disclosure include a one-dimensional nanophotonic film that is more amendable to large scale fabrication than a two-dimension photonic crystal design. As previously discussed, the one-dimensional nanophotonic film can include flat layers of material (with no holes in the layers). Further, embodiments in accordance with the present disclosure include the use of a sealed enclosure to minimize the heat load on the plurality of different material.

Example radiative cooling apparatuses include an apparatuses that reduces both convection and conduction of the radiative cooling apparatuses under peak solar irradiance. In accordance with a number of embodiments, a radiative cooling surface (e.g., multiple alternating layers of material or the optical glass and PFTE) is deposited on an 8-inch Silicon wafer and placed on a polystyrene pedestal which is supported by a clear acrylic box. A clear 12.5 µm polyethylene film covers the surface as an IR-transparent wind shield. As can be seen in FIG. 1, the radiative cooling surface is suspended in a sealed gap to ensure that no surface is in immediate contact with the gap or the sample may itself heat up due to solar irradiance. Further, to allow for peak sunlight irradiance of up to 890 W/m² on the radiative cooling surface, the entire radiative cooling apparatus is tiled 30 degrees to the south. The angle can reduce sky-access for the purposes of thermal emission, $P_{rad}$, meaning that the results presented herein can include a lower bound of performance of apparatuses in accordance with the present disclosure.

Figures 6A, 6B:
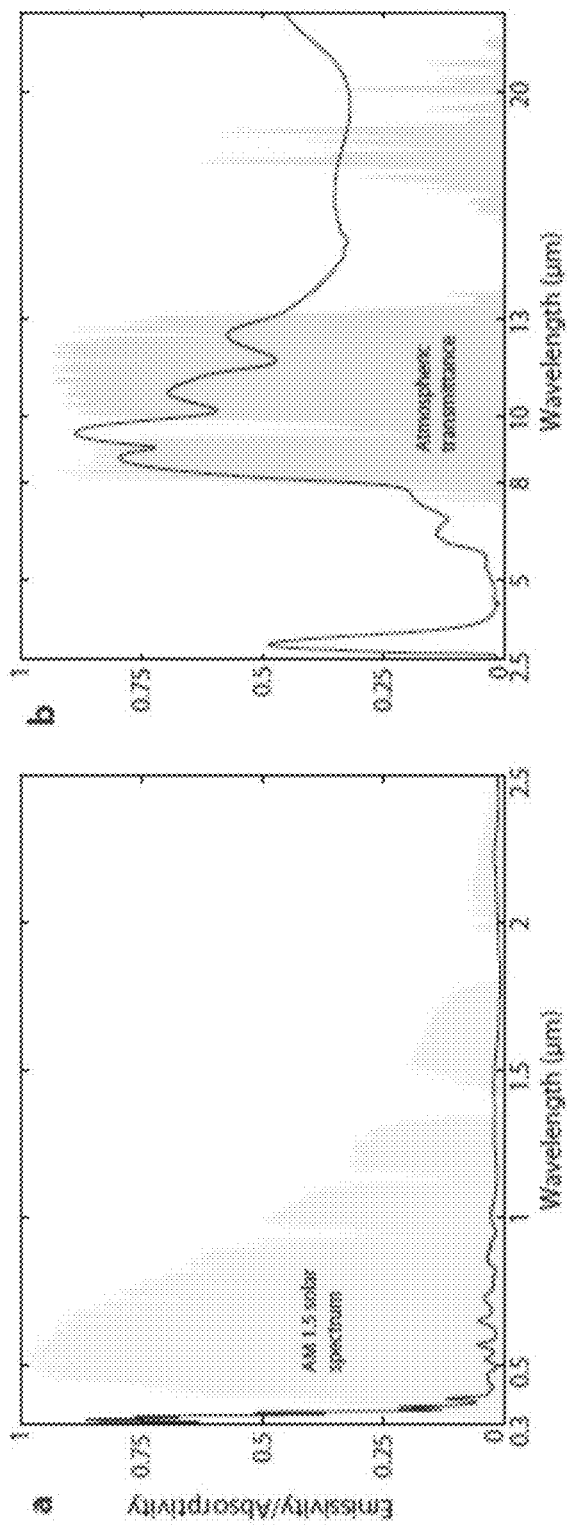
FIGS. 6A-6B show the absorptivity/emissivity spectrum of a radiative cooling apparatus comprised of multiple alternating layers of material, in accordance with various embodiments of the present disclosure.

FIGS. 6A-6B shows the absorptivity/emissivity spectrum of a radiative cooling apparatus comprised of multiple alternating layers of material, as previous discussed and illustrated by FIG. 1. As illustrated, SiO2 has a peak in its absorptivity at near 9 µm due to its phonon-polariton resonance, and HfO2 also presents non-zero absorption and hence emission in the 8-13 µm wavelength range.

As illustrated by FIG. 6A, a radiative cooling apparatus comprised of multiple alternating layers of materials can show a minimal absorption from 300 nm to 4 µm wavelengths, where the solar spectrum is present and can reflect 97% of incident solar power at near-normal incidence. The measured absorptivity/emissivity can be at a five degree angle of incidence of the radiative cooling apparatus over optical and near-IR wavelength with AM 1.5 solar spectrum plotted for reference, using an unpolarized light source.

FIG. 6B illustrates the selective emissivity of such a radiative cooling apparatus in the atmospheric window between 8 and 13 µm. For example, the emissivity of radiative cooling apparatuses in accordance with the present disclosure can extend to a range of angles (e.g., see Appendix A, extended data FIG. 1), which can be useful to maximize radiated power $P_{rad}$, a hemispherically integrated quantity (e.g., Equation 2), and reminiscent of the behavior of hyperbolic metamaterials. Such spectral behavior, and below ambient cooling, is achievable using the combination of materials.

In FIG. 6B, the measured absorptivity/emissivity can be at a five degree angle of incidence of the radiative cooling apparatus over mid-IR wavelengths using an unpolarized light source, with a realistic atmospheric transmittance model plotted for reference. The radiative cooling apparatus can achieve selective emissions within the atmospheric window.

At least portions of the sealed enclosure and/or other support structure can be shaded from direct exposure to sunlight. For example, portions of the sealed enclosure can include a coating of material to shade the portions from sunlight.

Figure 7A:
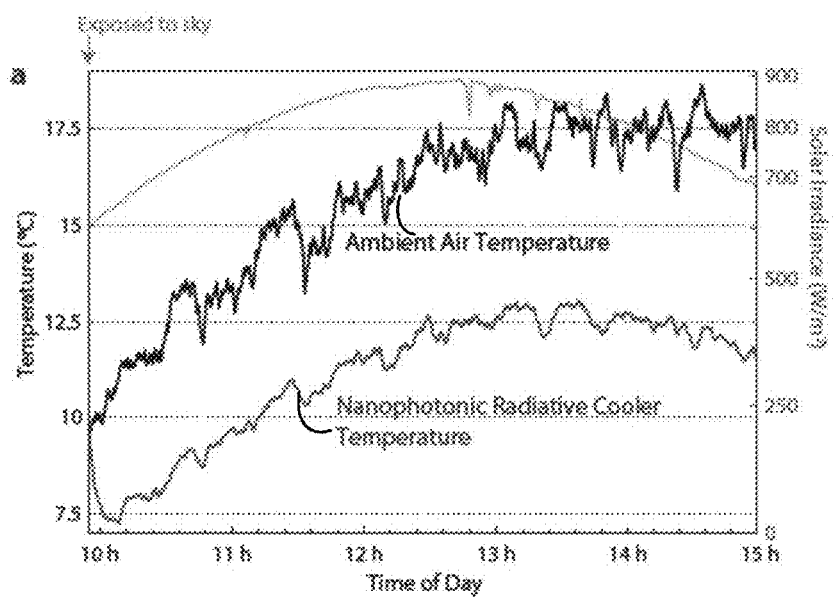
FIGS. 7A-7B show temperature of a radiative cooling apparatus as compared to ambient air temperature, black paint, and aluminum, in accordance with various embodiments of the present disclosure.
Figure 7B:
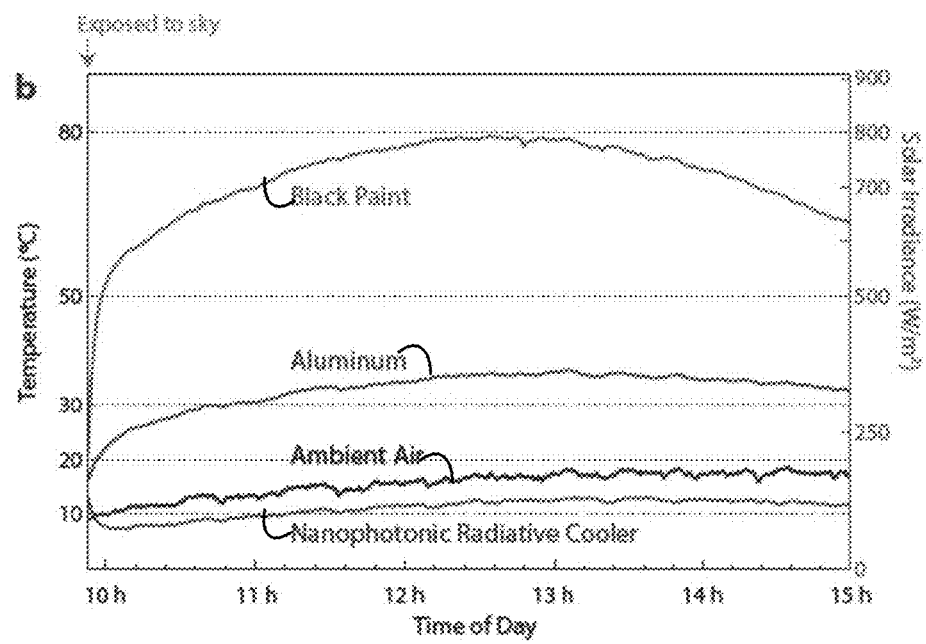

FIGS. 7A-7B illustrates temperature of a radiative cooling apparatus as compared to ambient air temperature, black paint, and aluminum. A radiative cooling apparatus comprised of multiple alternating layers of material can be exposed to the sky on a building of a roof during daylight hours. The equilibrium temperature of the radiative cooling apparatus can be compared to the ambient air temperature. As shown in FIG. 7A, after the sample is exposed to the environment (shortly before 10 am), the equilibrium temperature drops to below the ambient air temperature by approximately 4-5 degree C. or more, even though significant solar irradiance is incident on the sample. This result is surprising as typically a surface temperature increases when removed from the shade and exposed to the sun during the day. As illustrated by FIG. 7A, the equilibrium temperature of the radiative cooling apparatus can be observed for over five hours under direct sunlight. During the observation, over 800 W/m² of solar power is incident on the sample for three of the five hours. During this time, the radiative cooling apparatus maintains an equilibrium temperature substantially below the ambient air temperature and is 4.9 degrees C.±0.1 C below the ambient air temperature between the hours of 1300 and 1400 when the solar irradiance ranges from 800-870 W/m².

FIG. 7B further illustrates the temperature performance of the radiative cooling apparatus against 8 inch wafers in identical apparatuses with the conventional material of (carbon) black paint and aluminum. The black paint can reach near 80 degrees C., or over 60 degree C. above ambient air temperature, while the aluminum can reach 40 degrees C. or over 20 degrees C. above ambient air temperature. Typically roof material has strong solar absorption and can significantly heat up under direct sunlight, as emulated by the black paint. Also, aluminum can result in (strong) heating, even though it can provide relatively strong solar reflection. The below ambient temperature obtained using radiative cooling apparatuses in accordance with the present disclosure is truly unique and surprising.

Figures 8A, 8B:
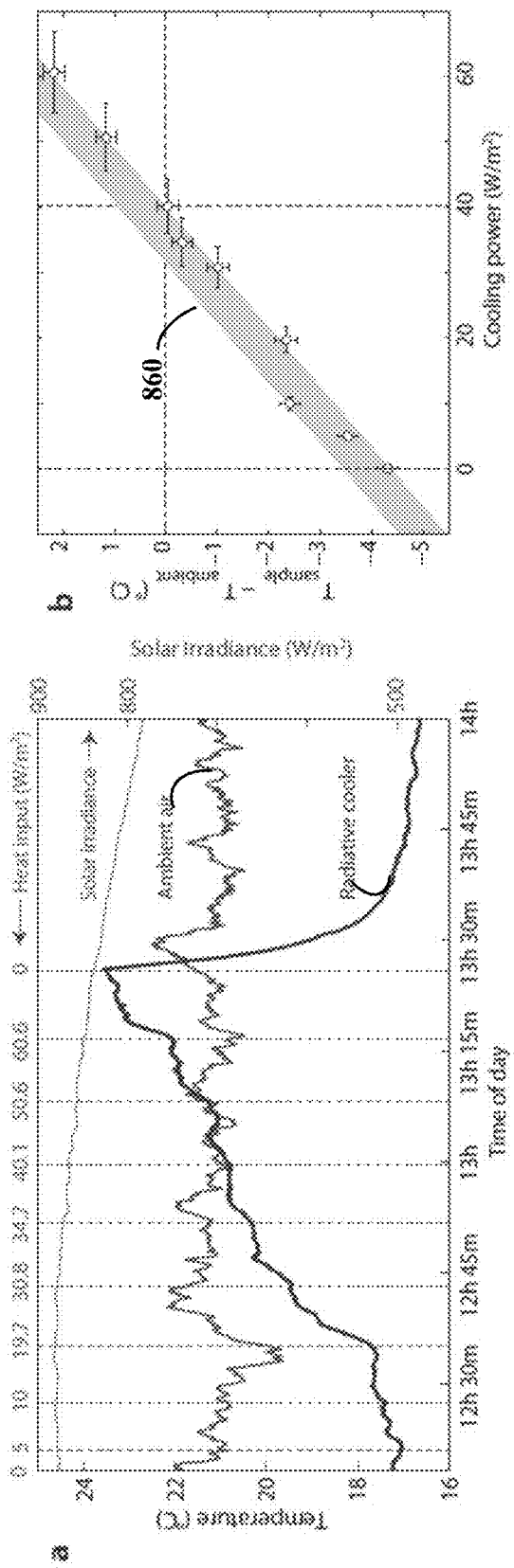
FIGS. 8A-8B show a characterization of cooling power of a radiative cooling apparatus, in accordance with various embodiments of the present disclosure.

FIGS. 8A-8B shows a characterization of cooling power of a radiative cooling apparatus in accordance with various embodiments. For example, the temperature of the radiative cooling apparatus is allowed to reach a previously achieved equilibrium value under peak sunlight conditions of nearly 900 W/m². Heat can be input to the radiative cooling apparatus over the course of an hour and the temperature of the radiative cooling apparatus can be observed, as illustrated by FIG. 8A. With each increase of heat input, the temperature of the apparatus rises to a new equilibrium. The temperature of the radiative cooling apparatus as a function of heat power can be plotted, as illustrated by FIG. 8B. The temperature of the radiative cooling apparatus reaches ambient temperature with an input heat power of 40.1±4.1 W/m², indicating that substantial cooling power is available from various apparatuses in accordance with the present disclosure.

A theoretical model 860 of the radiative cooling apparatus can be formed. This model 860 is based on Equation 1, with the spectral data illustrated by FIG. 5, as well as a model of atmospheric transmittance, and a model for the conduction and convection losses of the apparatus that together yields a value of $h_c$=6.9 W/m²K (e.g., see Methods and Extended Data FIG. 2 of Appendix A). The theoretical model 860 is consistent with the experimental data (e.g., see FIG. 8b). Moreover, the model 860 indicates substantial future potential for such apparatuses by reducing interior air convention. Under the same atmospheric and solar conditions, but with $h_c \to 0$, the radiative cooling apparatus can achieve an equilibrium temperature of 19.5 degrees C. below ambient (e.g., see Appendix A, Extended Data FIG. 2c). Substantial gains in the radiative cooling apparatus performance is achievable by improved packaging.

To determine a cooling power of a radiative cooling apparatus, a polyimide resistive heater can be attached adhesively to the underside of the arrangement of the plurality of different material (e.g., the underside of the multilayer stack). The heater can deliver varying amounts of input to varying input voltages from a direct current source (with ±1% readout accuracy), and has a resistance tolerance of ±10%. The radiative cooling apparatus can initially be allowed to equilibrate with zero heat input. Increasing quantities of heat can then be applied constantly for time periods of 8-10 minutes, as shown in FIG. 8A. With each increase in heat applied, denoted numerically at the top of FIG. 8A, the temperature of the sample rises and plateaus. The average temperature over the last two minutes of each time block can be used to define the radiative cooling apparatus' temperature for the corresponding heat input, as shown in FIG. 8b. The solar irradiance on the radiative cooling apparatus over the entire time period can stay within a range of 850 to 880 W/m².

In various embodiments, heat transfer can be simulated to better understand convective and conductive loss mechanisms and to quantify $P_{cond+conv}$ and $h_c$ as defined in Equation 5. A numerical model can simulate the setup in two-dimensions with three objects: a thin radiator, surrounding air, and the supporting polystyrene block. The air temperature, conductive properties of all objects, and the value of heat flux $P_{out}$ leaving the radiator can be defined, allowing inference of $P_{cond+conv}$ as a function of the radiator's temperature T. The outside boundaries of the system (e.g., shown at the top of Extended Data FIG. 2a in Appendix A) are set to the air temperature. The simulation handles the fluid mechanics in the gap and the conduction in the polystyrene block and the radiator in order to determine the steady state temperature T of the sample for each value of $P_{out}$. At the steady state temperature, $$P_{out}=P_{cond+conv}=A \cdot h_c(T_{amb}-T),$$

(see, Appendix A, Extended Data FIG. 2b, whose slope is the simulations prediction of the non-radiative heat transfer coefficient $h_c$). By using linear regression, the value of $h_c$=6.9 W/m²/K which can be used with the theoretical model 860 in FIG. 8B and fits the observed data well.

Further, the radiated power of the radiative cooling apparatus can include $P_{net}(T,T_{amp})=P_{rad}(T)-P_{atm}(T_{amb})-P_{sun}$ (see, Appendix A of the underlying provisional application, Extended Data FIG. 2b). Since $P_{net}$ cannot be independently observed, the previously discussed theoretical model can be used. As a check, the intersection of these curves is the prediction of the theoretical model 860 and numerical heat transfer for simulation for the expected equilibrium temperature $T_{eq}$ of the radiative cooling apparatus. A value of 4.2 degrees C. below ambient temperature is found, which corresponds well with the observed results of 4.3 degrees C. below ambient air temperature as illustrated by FIG. 8b for data obtained during the day when cooling power is measured (e.g., a different day from the equilibrium temperature measurement). The combination of the theoretical model 860 based on radiative properties, and a numerical heat transfer model for non-radiative behavior, can thus model the behavior of the radiative cooling apparatus.

Figure 9A:
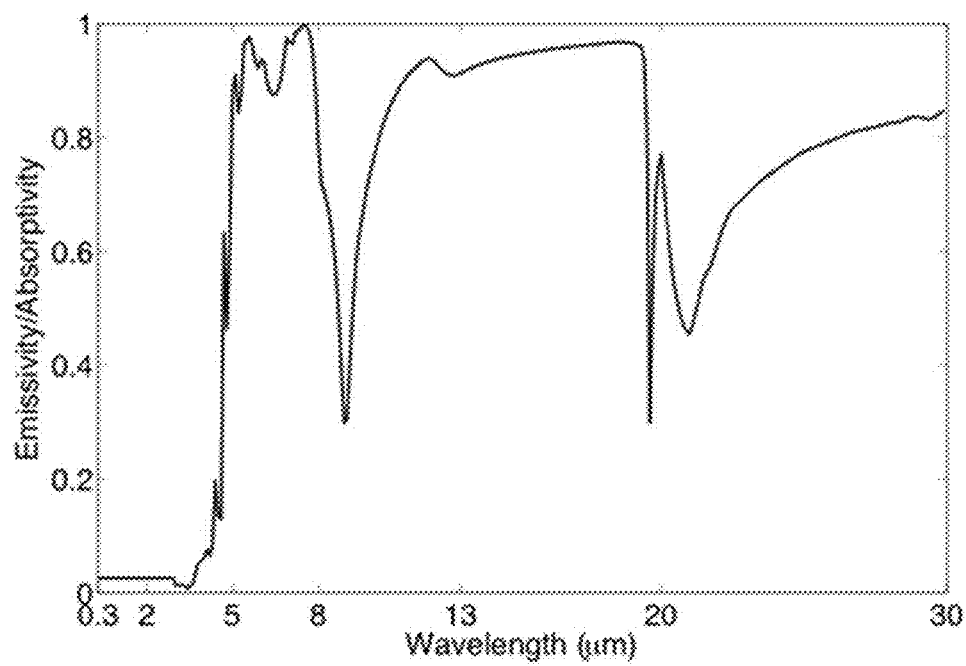
FIGS. 9A-9B show an example performance of a radiative cooling apparatus comprised of optical glass and a diffuse white reflector, in accordance with various embodiments of the present disclosure.
Figure 9B:
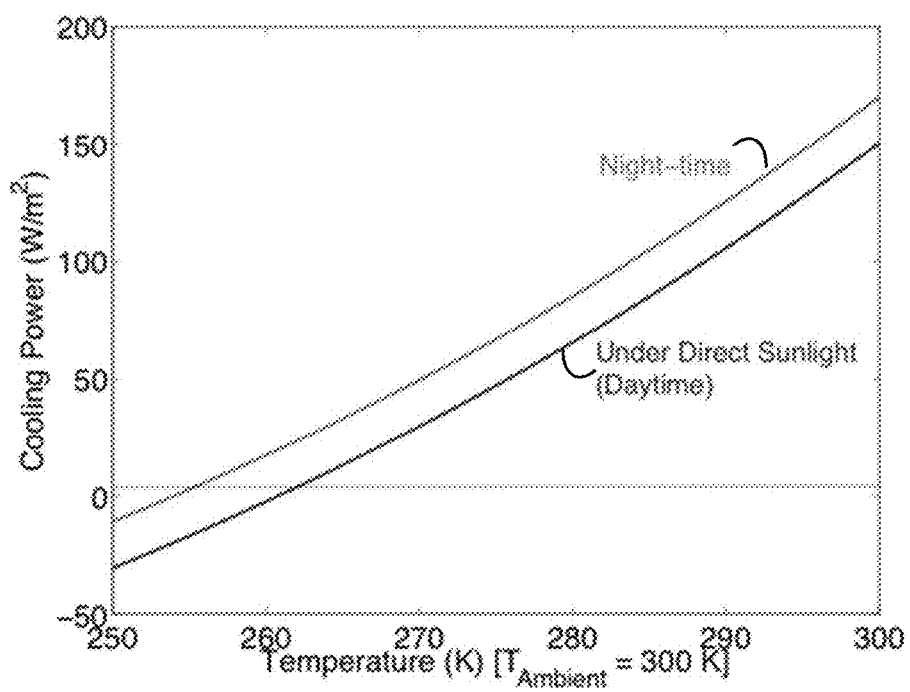

FIGS. 9A-9B illustrate example performance of a radiative cooling apparatus comprised of optical glass and a diffuse white reflector. As previously discussed, the diffuse white reflector can be PTFE/Teflon. FIG. 9A illustrates the emissivity/absorptivity of the optical glass and diffuse white reflector observed. For example, the radiative cooling apparatus comprised of optical glass and PTFE/Teflon can reflect 98% of visible/near-IR light. FIG. 9B illustrates the cooling power performance of the radiative cooling apparatus comprised of optical glass and the diffuse white reflector as a function of temperature (for ambient temperature of 300K) during both the day and night.

The energy savings enabled by covering a roof of a commercial building with the radiative cooling apparatus can be analyzed. Further, projected levelized cost of cooling for a range of realistic installed costs can be compared to costs of alternatives, like air conditioners driven by photovoltaic panels. To highlight the energy savings of the radiative cooling apparatus, a basic analysis can be performed, where a building is assumed to conduct its heat to the radiating surface on the roof, while a standard heating, ventilation, and air conditioning (HVAC) system handles other cooling requirements. EnergyPlus™ simulations can be used to determine the cooling load for a three-story medium-sized commercial benchmark building with a 1600 $m^2$ roof on an hourly basis over a year in Phoenix, Ariz. The building's interior is assumed to be maintained at $T_{interior}$=24 degrees C. at all hours of the day. The cooling power made available by the radiative cooling apparatus in accordance with the present disclosure is calculated on an hourly basis, $P_{cool}(T=T_{interior}, T_{amb}(t), t)$, from Equation 1. Typical meteorological data year (TMY2) data for Phoenix can be used to determine $T_{amb}(t)$ and $P_{sun}(t)$ on the hourly basis. The model of the radiative cooling apparatus, as previously discussed, is used to calculate $P_{cool}$ on the hourly basis for each corresponding value of $T_{amb}$ and $P_{sun}$ at the specified $T=T_{interior}$ set-point.

The hourly values of $P_{cool}$ can be subtracted from the heat load for the building as determined by the EnergyPlus™ simulation(s). The remaining heat load can be assumed to be dissipated with a standard cooling system with a coefficient of performance (COP) of $2.8^2$. Therefore, the use of a radiative cooling apparatus translates into savings in electric power of $P_{cool}$/COP. Integration of this savings over a period of time then gives an overall electrical savings in kilowatt-hour (kWh). Here, the radiative cooling apparatus can operate twenty-four hours a day, and in fact, can perform even better in the absence of sun at night as compared to day. If there is no cooling demand for the building, for example, during winter evenings, the cooling power of the roof is assumed to be unused. This savings in KWh is plotted in Appendix A, Supplementary FIG. 1 of the underlying provisional application, on a monthly basis, and yields an annual projected electricity savings of $1.185 \times 10^5$ kWh. By being able to operate at all hours of the day, the radiative cooling apparatus can have a shorter payback period for buildings and regions where there is cooling demand at all hours. Appendix A, Supplementary FIG. 1 illustrates the greater kWh savings during summer months in Phoenix when, in addition to higher demand during the day, there is cooling demand even at night.

To provide an estimate of the monetary value of the energy savings possible with a radiative cooling apparatus, a standard project analysis can be performed. In the analysis, it can be assumed that the radiative cooling apparatus has a twenty-year lifespan, a grid electricity cost of $0.10/kWh, fixed operating cost at $0.8/$m^2$ (between 1-2% of the range of installed costs), a discount rate of 5%, and an installed cost of between $20/$m^2$ and $70/$m^2$. Such installed costs are in line with what is currently achieved at scale for similar multilayer coatings for low-emissivity windows and other sources. This analysis can yield unsubsidized levelized cost of cooling (for energy saved) between $0.03/kWh and $0.09/kWh which are below even aggressive levelized cost projections for both rooftop and utility-scale photovoltaics over the coming decade. This indicates that nanophotonic radiative cooling apparatuses hold the potential to be a large-area renewable solution to reducing cooling costs for buildings, relative to other solutions.

The analysis described above is a first-order estimation of the potential of the radiative cooling apparatuses that operate at all hours of the day. In practice, the specific implementation and integration of the radiative cooling apparatuses may take different forms, including their direct integration with air-cooled or water-cooled condensers to allow for low-lift operation. Moreover, the assumptions throughout is that the sunlight, 97% or more of which is reflected by the radiative cooling apparatus, goes unused. Various apparatuses and systems may use this reflected sunlight, allowing for shorter payback periods and lower levelized costs. And, the radiative cooling apparatuses in various embodiments can cooperatively work with photovoltaic panels on the rooftop by, for example, reducing demand for cooling in the later afternoon and early evening hours when air temperatures remain high while solar irradiance is minimal.

Moreover, as detailed in FIGS. 11-13, heat exchange with a liquid, gas or solid is an important manifestation of the apparatus and its use in such scenarios. Water, for example, is typically used by large buildings to transfer heat from rooms to a central chiller or air conditioning system. The chilled water generated by the radiative cooling apparatus can thus be used to substitute directly for air conditioning in a building, or to lower the operating temperature of the condenser of a chiller. Furthermore, it can be combined with thermal storage, for example using phase-change materials that can be cooled during certain hours of the day and heat can be absorbed during other hours of the day. In this way, the thermal storage can effectively store the cooling resources (e.g., cooling capacity) that the system achieves at certain hours to be used at other hours of the day. Such an apparatus can also be directly integrated with the roof of a building or other permanent or temporary built structure.

The various results illustrated by FIGS. 6-9 can be obtained using a radiative cooling apparatus placed on a flat roof of a three story building in California in December. The back-surface of the multilayer stack of the radiative cooling apparatus can be equipped with an adhesive resistance temperature detector (RTD) sensor connected to a data logger, collectively rated to ±0.1 degrees C. Direct and diffuse solar radiance incident on a sample is measured over the same time period using a pyranometer and data logger. Ambient air temperature can be measured using an air temperature RTD probe with ±0.1 degrees C. accuracy in a sun-shaded area outside the gap around the sample. To determine the cooling power of the radiative cooling apparatus, a polyimide resistive heater is attached adhesively to the underside of the multilayer stack. The theoretic model 860 represented by the gray line in FIG. 8B is arrived at using Equation 1. A MODTRAN™5 can be used to model the atmosphere in the infrared for a clear sky at mid-latitudes during winter. $H_c$ can be derived by numerical heat transfer modeling.

Figure 10A:
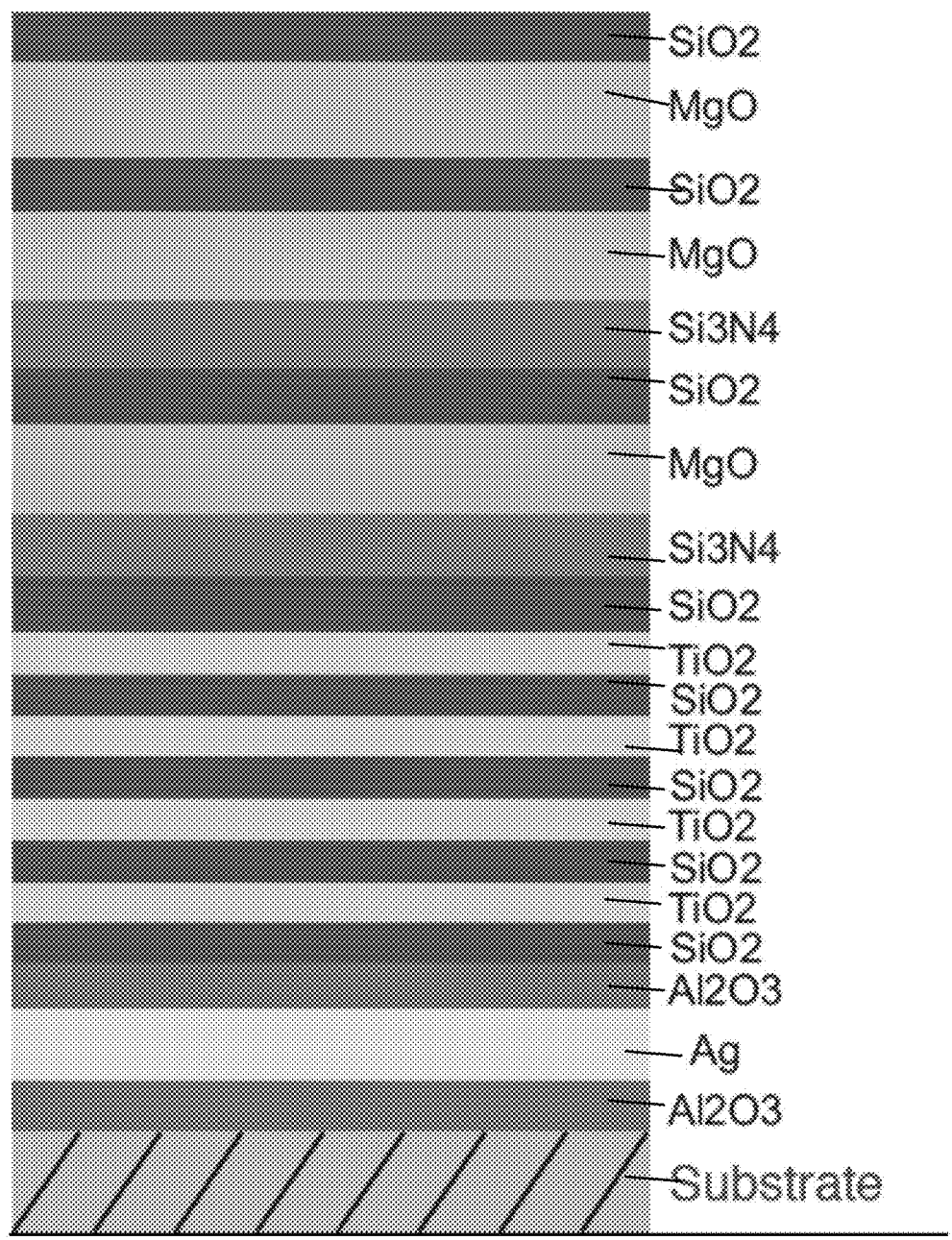
FIGS. 10A-10B show examples of a radiative cooling apparatus comprised of multiple layers of dielectric and metallic materials, in accordance with various embodiments of the present disclosure.
Figure 10B:
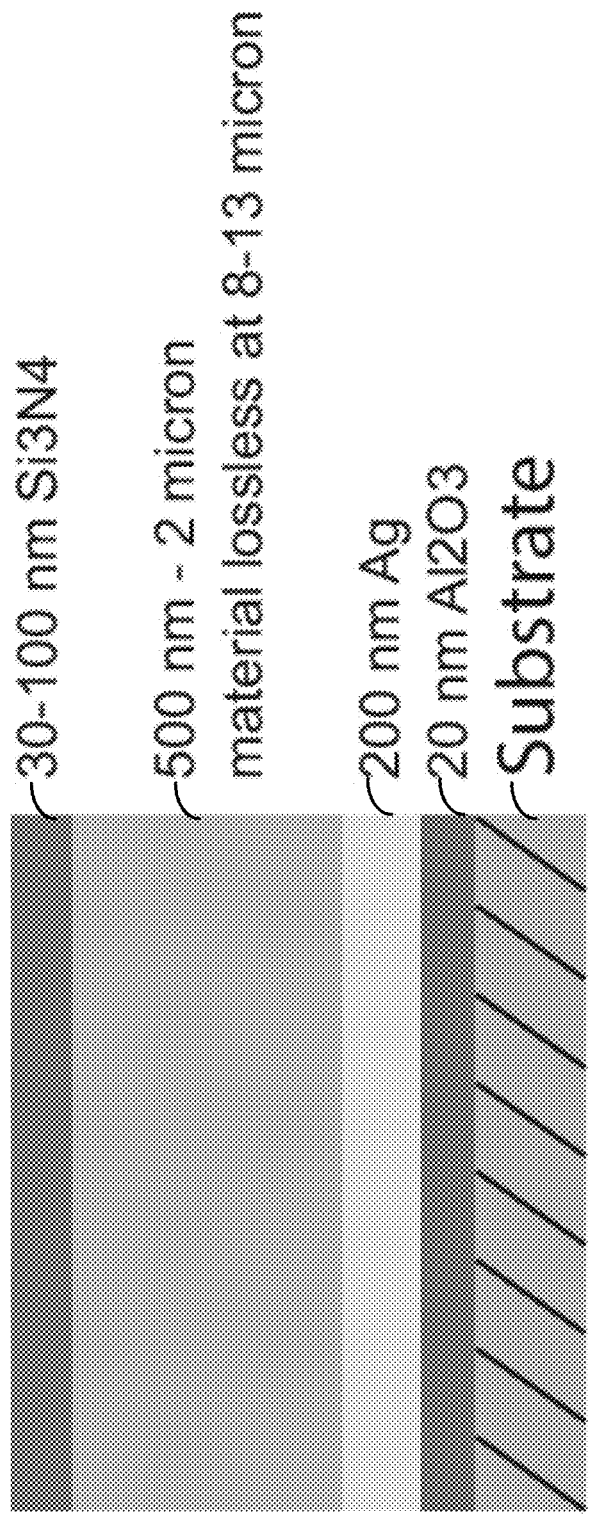

FIGS. 10A-10B show examples of a radiative cooling apparatus comprised of multiple layers of dielectric and metallic materials, in accordance with various embodiments of the present disclosure. For example, FIG. 10A illustrates a multi-layer stack, in accordance with some embodiments, comprised of alternating layers of $SiO_2$, MgO, $Si_3N_4$, $TiO_2$. The multi-layer stack of the alternating layers of different material can include the solar spectrum reflecting portion and the thermally-emissive portion of the plurality of different material, as previously discussed herein. Below the multi-layer stack can include a layer of $Al_2O_3$, Ag, another layer of $Al_2O_3$, and the substrate (e.g., a metal layer (e.g., the metallic (Ag) portion) to be placed in thermal contact with the object being cooled, one or more adhesion layers and the substrate). Further, FIG. 10B illustrates a multi-layer stack, in accordance with a number of embodiments, that comprises layers of $Si_3N_4$ and material lossless at 8-13 micron. Below the multi-layer stack can include a layer of Ag, $Al_2O_3$, and the substrate. The various depth dimensions (e.g., depth/thickness of the layer relative to an object) are for illustrative purposes and various depths dimensions of each layer can be used in accordance with various embodiments of the present disclosure.

Figure 11B:
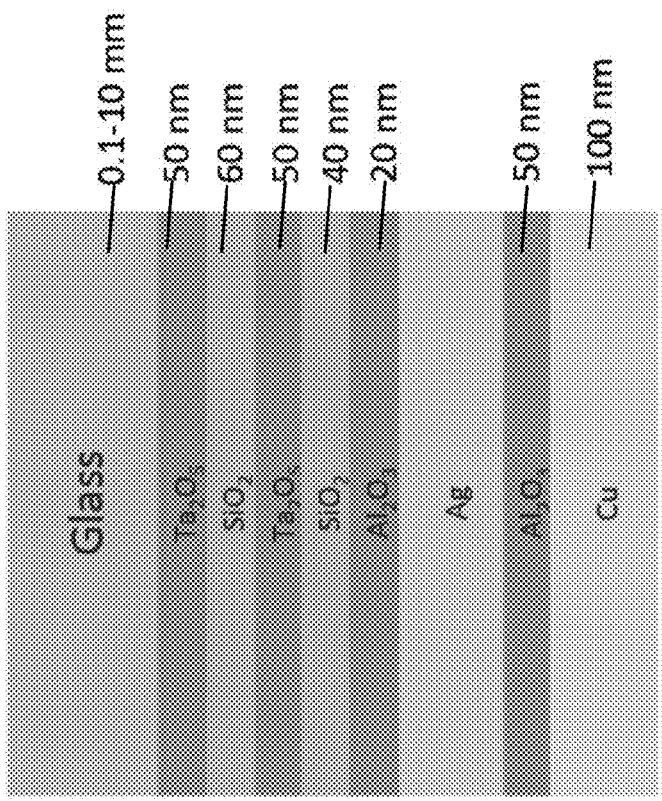
FIGS. 11A-11B show examples of a radiative cooling apparatus comprised of glass material and multiple layers of dielectric and metallic materials, in accordance with various embodiments of the present disclosure.
Figure 11A:
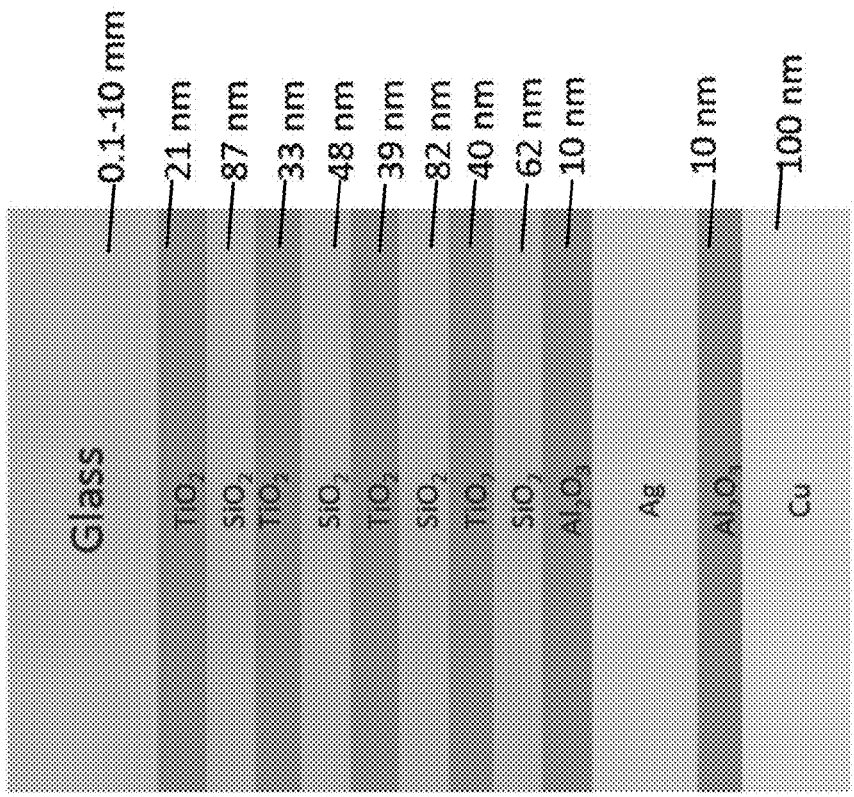

FIGS. 11A-11B show examples of a radiative cooling apparatus comprised of glass material and multiple layers of dielectric and metallic materials, in accordance with various embodiments of the present disclosure. The multiple layers of alternating different material can include the solar spectrum reflecting portion of the plurality of different material, and the glass material (e.g., optical glass) can include the thermally-emissive portion of the plurality of different material. The multiple layers of alternating material, in various embodiments, can be deposited on the glass material or can be deposited separately, and the glass material can be placed physically on top the multiple layers. As illustrated by FIGS. 11A-11B, the alternating layers of different material can include $TiO_2$ and $SiO_2$ or $Ta_2O_5$ and $SiO_2$, in various embodiments. Below the multiple layers of alternating different material can be one or more layers of $Al_2O_3$, Ag, and Cu (e.g., substrate material). The solar spectrum reflecting portion, in some embodiments, can include a base layer (e.g., substrate) of Ag and alternating layers of dielectric materials such as $TiO_2$ and $SiO_2$, or $Ta_2O_5$ and $SiO_2$. The solar spectrum reflection portion may be directly deposited via physical vapor deposition onto the glass or separately, with the glass physically placed on top of it, to allow for the combined suppression of the absorption of solar light, embodied in the emissivity/absorptivity spectrum, with the enhanced thermal emissivity by the glass. The various depth dimensions (e.g., depth/thickness of the layer relative to an object) are for illustrative purposes and various depths dimensions of each layer can be used in accordance with various embodiments of the present disclosure.

FIGS. 12A-12D show examples of a radiative cooling apparatus in an integrated system designed to transfer cooling resources via a heat exchange interface, in accordance with various embodiments of the present disclosure. The integrated system can include a heat exchange interface, including a heat exchanger, and a sealed enclosure. The integrated system can be designed to transfer cooling resources from the arrangement of the plurality of different material via the heat exchanger. Further, the sealed enclosure can seal the arrangement of the plurality of different material (e.g., the radiative cooler) from the environment. The sealed enclosure can include edges and/or walls that are shaded from exposure to the sun with an adjustable shade made of reflective materials, in various embodiments.

Figure 12A:
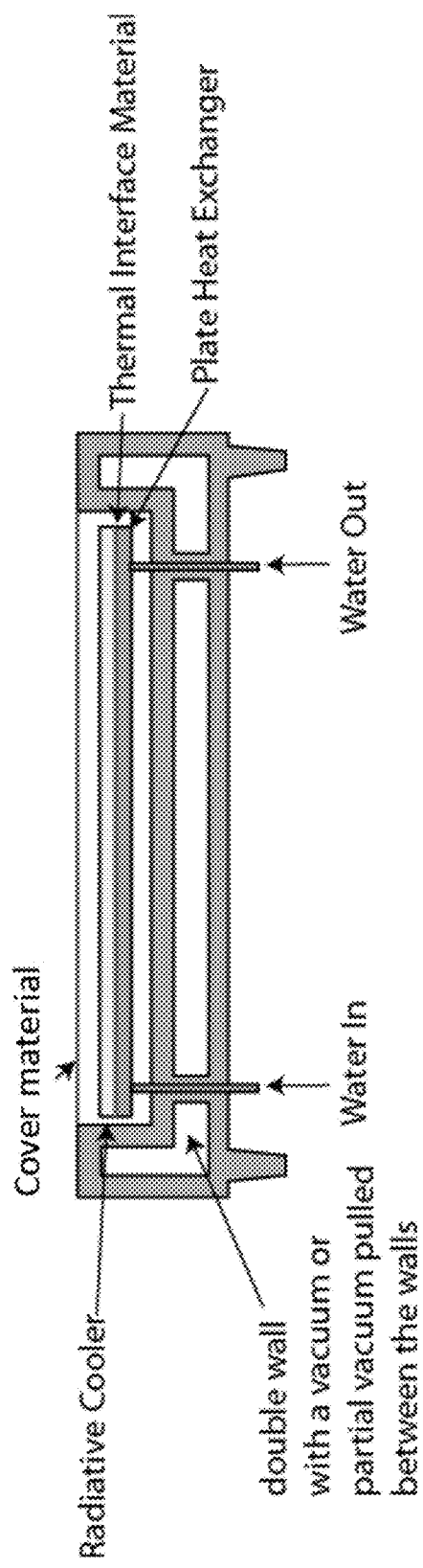
FIGS. 12A-12D show examples of a radiative cooling apparatus in an integrated system designed to transfer cooling resources via a heat exchange interface, in accordance with various embodiments of the present disclosure.

FIG. 12A illustrates an example integrated system with a radiative cooling apparatus sealed from the environment. The integrated system includes the sealed enclosure that creates the gap, as previously discussed, to seal the plurality of different material (e.g., radiative cooler) from the environment. The sealed enclosure and/or another support structure can include a double wall. The double wall can be used to create a vacuum or partial vacuum between the outer wall that is exposed to the environment and the inner wall that is sealed from the environment.

The integrated system can include a heat exchange interface, as previously discussed. For example, the heat exchange interface can include a plate heat exchanger and one or more conductive pipes. The conductive pipes can carry (e.g., pass) liquid or gas to a portion of the plate heat exchanger and the plate heat exchanger can cool the liquid or gas passing through the conductive pipe to conduct heat away from the object. For example, the plate heat exchanger can be arranged (e.g., in thermal contact) with the arrangement of the plurality of different material and the conductive pipe to cool liquid or gas passing through the conductive pipe. In various embodiments, the plurality of different material includes and/or is in thermal contact with a thermal interface material (e.g., an interface) and the thermal interface material is in thermal contact with at least a portion of the plate heat exchanger to effect a temperature of the at least portion of the plate heat exchanger. Thereby, if the liquid or gas passing through the conductive pipes is at a temperature that is different than a temperature associated with the plate heat exchanger, the plate heat exchanger can change (e.g., cool) the temperature of the liquid or gas. As illustrated, the conductive pipes can bring liquid or gas into the integrated system (from another location) and back out. The liquid or gas can travel from the object to be cooled (e.g., the building, HVAC system, server system, or other object to be cooled) to the integrated system and back to the object (or system associated with the object) to effect a temperature of the object.

Figure 12B:
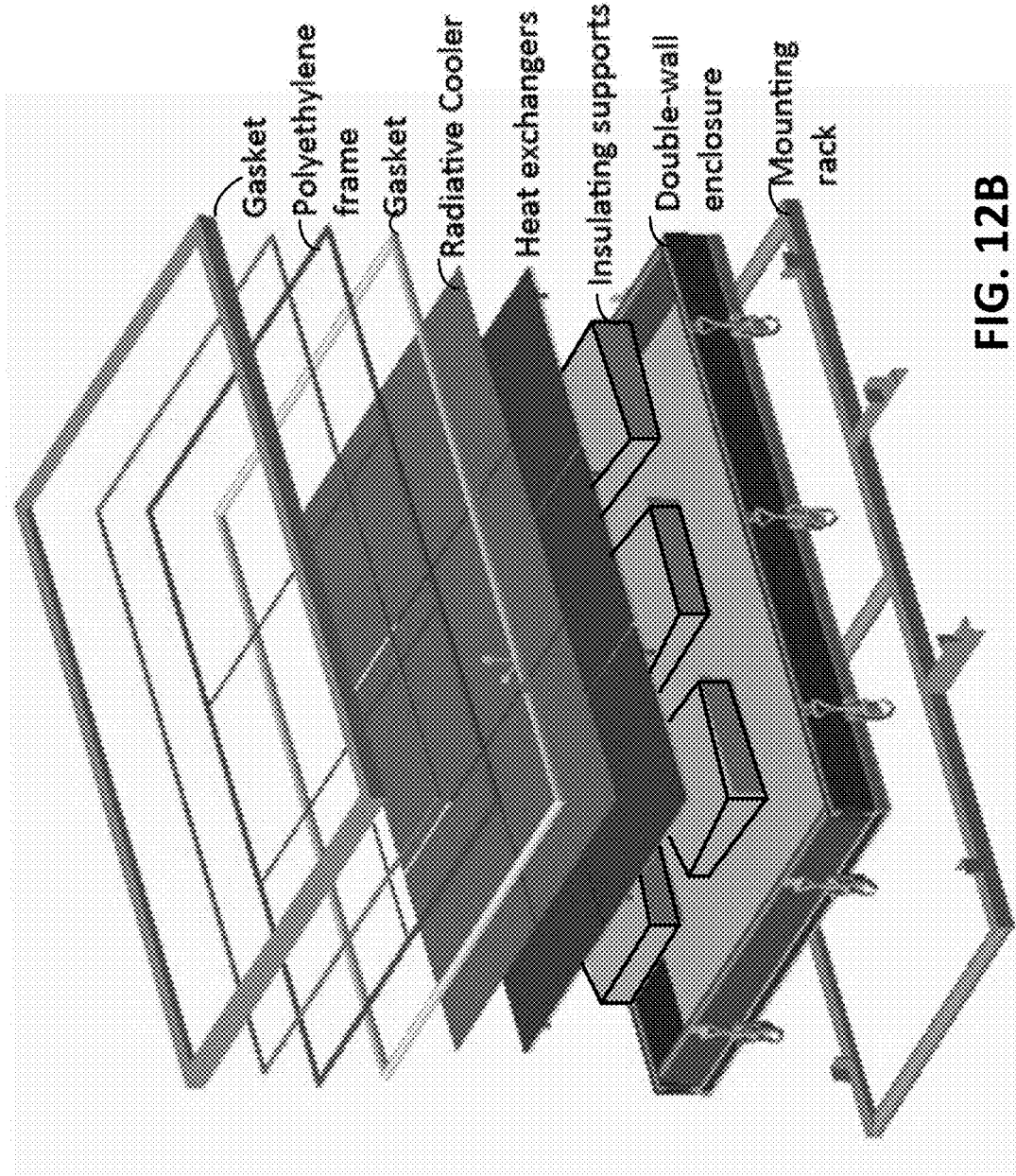

FIG. 12B illustrates an example of a sealed enclosure. Such a sealed enclosure can include the same and/or different enclosure than illustrated by FIG. 12A. Further, the sealed enclosure can be used in an integrated system, such as the integrated system illustrated by FIG. 12A. As illustrated, the sealed enclosure and/or integrated system can include one or more gaskets, a polyethylene frame, the radiative cooler, heat exchangers (e.g., heat exchange interface), insulating supports, a double wall, and a mounting rack, in various embodiments.

Figure 12C:
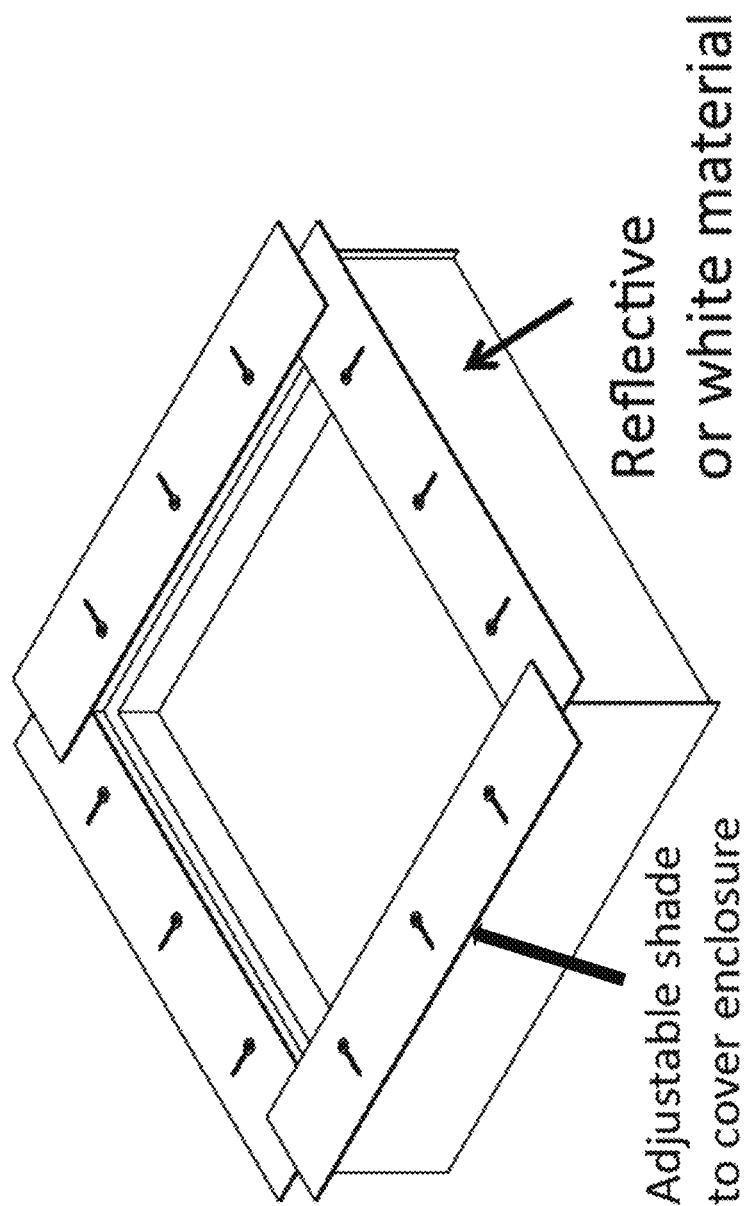

FIG. 12C illustrates an example of a sealed enclosure that includes shading from the sun. In accordance with a number of embodiments, portions of the sealed enclosure and/or other support structure can be shaded from exposure to sunlight. The shading can include a reflective and/or light colored material layer (e.g., white) on the sealed enclosure and/or support structure and/or an adjustable shade. The adjustable shade can include material that is placed on portions of the sealed enclosure to block the portions of the sealed enclosure from sunlight while allowing sunlight on the arrangement of the plurality of material. The adjustable shade and reflective material can shade the edges and/or portions of the wall of the sealed enclosure from the sun.

Figure 12D:
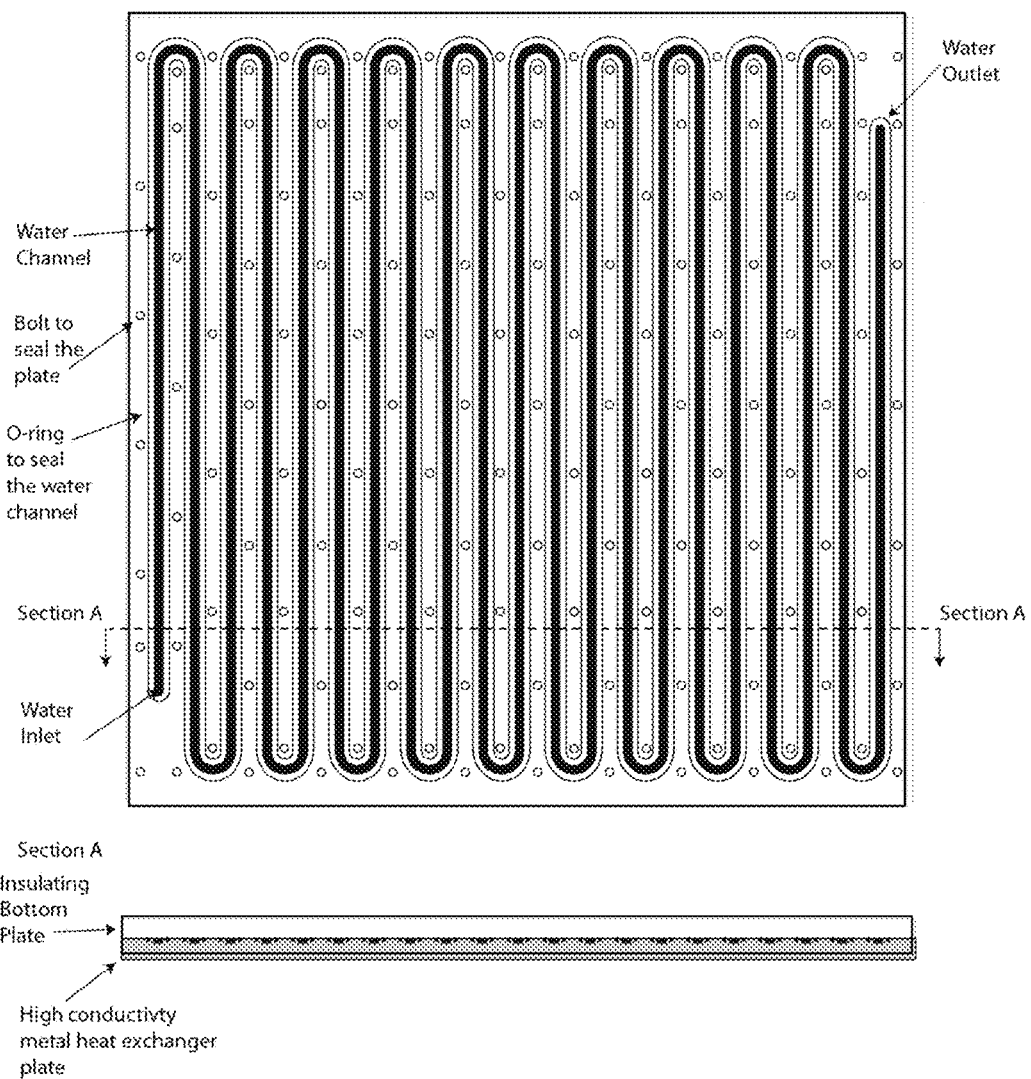

FIG. 12D illustrates an example of a heat exchange interface. The heat exchange interface illustrated in FIG. 12D can include the same or different heat exchange interface than illustrated in FIG. 12A. Further, in some embodiments, the heat exchange interface can include a portion of the integrated system as illustrated by FIG. 12A. In some embodiments, the heat exchange interface can include a channel. The channel, as illustrated by FIG. 12D, can extend along a surface of a (insulating) plate. The channel can pass liquid or gas along the surface of the plate. The arrangement of the plurality of different material and the plate can be arranged to cool the liquid or gas passing through the channel to conduct heat away from the object. For example, the channel can extend in a pattern, such as the snake-like pattern illustrated by FIG. 12D, to maximize thermal contact of liquid or gas passing through the channel with the plate. The plate can be in thermal contact with the plate heat exchanger (which is in thermal contact with the arrangement of the plurality of material) and/or or in thermal contact with the arrangement of the plurality of material. A temperature of liquid or gas flowing through the channel can be effected by a temperature of the plate, which is effected by a temperature associated with the arrangement of the plurality of material.

As a particular example, liquid or gas entering the channel at the water inlet can first pass by an object. Assume that the temperature of the object is at or greater than ambient air temperature and is greater than a temperature of the plate. The temperature of the plate is relative to a temperature of the arrangement of the plurality of material. Further, the temperature of the arrangement of the plurality of material in various embodiments can be less than ambient air temperature. Thereby, when liquid or gas flows through the channel at the portions that are in thermal contact with the plate, the temperature of the liquid or gas can be reduced from a temperature when the liquid or gas entered. The water outlet can, in various embodiments, lead back to the object and/or a system associated with the object to lower a temperature of the object. Example objects can include a building/portion of a HVAC system, a server and/or server system, an automobile and/or other engine, among various other objects.

Figure 13A:
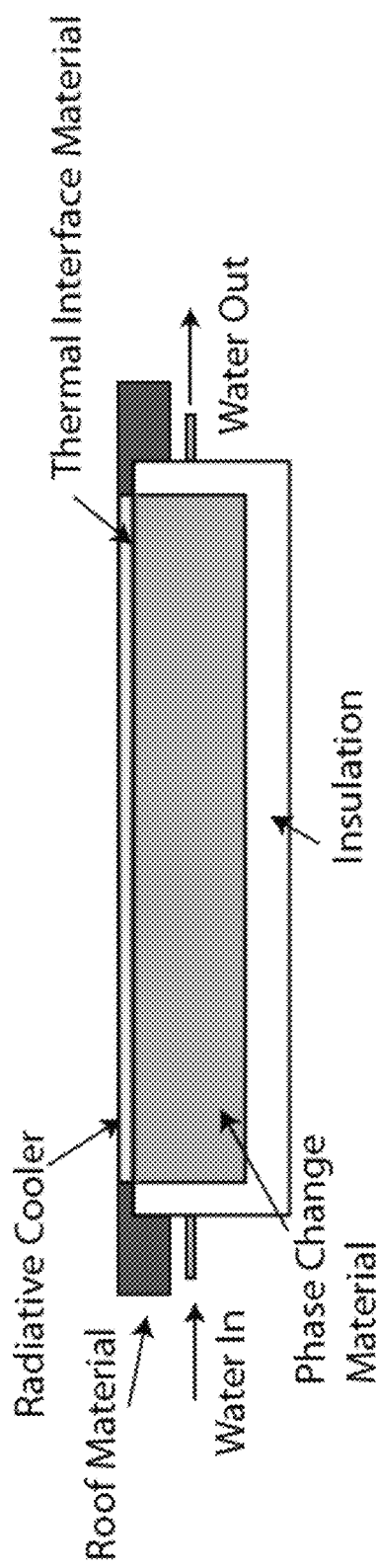
FIGS. 13A-B show examples of a radiative cooling apparatus arranged to transfer heat to and from a phase-change material, in accordance with various embodiments of the present disclosure.
Figure 13B:
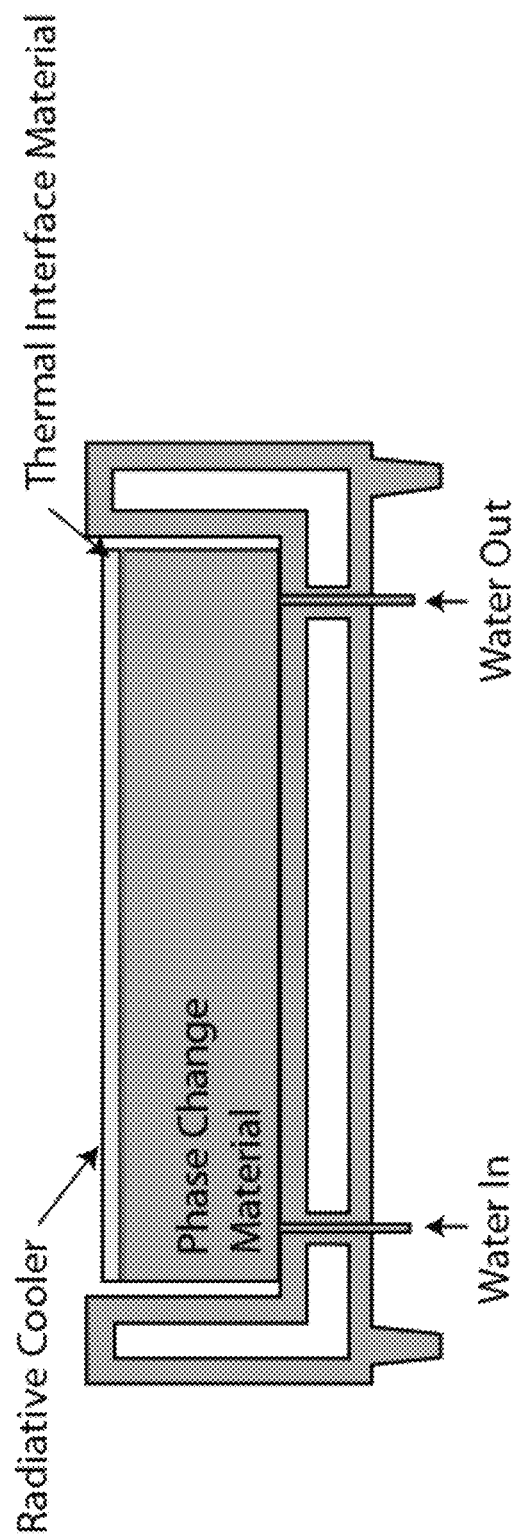

FIGS. 13A-B show examples of a radiative cooling apparatus arranged to transfer heat to and from a phase-change material, in accordance with various embodiments of the present disclosure. The radiative cooling apparatus, in some embodiments, can include a heat exchange interface that can interface with phase-change material either directly or indirectly to allow for thermal storage driven by the radiative properties of the plurality of different materials. A phase-change material can include a substance with a high heat of fusion and which, melting and solidifying at a certain temperature, is capable of storing and releasing energy. For example, heat is absorbed or released when the material changes from solid to liquid, and vice versa. Example phase-change material can include organic materials (e.g., paraffin and fatty acids), inorganic materials (e.g., salt hydrates), eutectics (e.g., organic-organic, organic-inorganic, inorganic-inorganic compounds), and hygroscopic materials.

As illustrated by FIGS. 13A-13B, the phase-change material can be in thermal contact with the arrangement of the plurality of material (e.g., the radiative cooler). Further, the radiative cooling apparatus can be a portion of an integrated system, such as those illustrated by FIGS. 12A-12D. For example, FIG. 13A illustrates the radiative cooling apparatus and phase-change material that is embedded inside (e.g., integrated within) a roof (e.g., roof material) of a building or a structure. The radiative cooling apparatus and phase-change material can include an enclosure (e.g., insulation) at least in part surrounding the radiative cooling apparatus and the phase-change material. A thermal interface material can be in thermal contact with the arrangement of the plurality of different material and in thermal contact with the phase-change material to transfer heat and/or cooling resources to and from the phase-change material. In accordance with some embodiments, an additional heat exchange interface is present between the phase-change material and the liquid or gas (e.g., the conductive pipes or other material). For example, the integrated system can include a conductive pipe in thermal contact with the phase-change material. The phase-change material can thermally store the cooling resources of the radiative cooling apparatus, which can be used at a different time of the day and/or concurrently with storage of the cooling power. A temperature of liquid or gas flowing through the conductive pipe can change based on a temperature difference of the liquid or gas and the phase-change material (e.g., similarly to the plate heat exchanger previously described). FIG. 13B illustrates the radiative cooling apparatus and the phase-change material in a sealed enclosure, such as the sealed enclosure previously described and illustrated by FIG. 12A. The phase-change material can be in thermal contact with the arrangement of the plurality of material and the conductive pipe to effect a temperature of liquid or gas in the conductive pipe.

The embodiments and specific applications discussed herein may be implemented in connection with one or more of the above-described aspects, embodiments and implementations, as well as with those shown in the appended figures.

The following references are hereby fully incorporated by reference for their teachings generally, and specifically for examples of further details regarding cooling efficiency and energy costs, and for reasons provided in this application and corresponding Appendices of the underlying provisional application:

A. Burdick, "Strategy guideline: Accurate heating and cooling load calculations," Tech. Rep., U. S. Dept. of Energy: Energy Efficiency and Renewable Energy, http://www.nrel.gov/docs/fyllosti/51603.pdf, 2011;

U. E. I. Administration, "Annual Energy Outlook 2012," Tech. Rep., U. S. Dept. of Energy, 2012;

L. R. J. R. Robb A. Barnitt, Aaron D. Brooker and K. A. Smith, "Analysis of off-board powered thermal preconditioning in electric drive vehicles," Tech. Rep., National Renewable Energy Laboratory, http://www.nrel.gov/vehiclesandfuels/vsa/pdfs/49252.pdf, 2010;

R. Farrington and J. Rugh, "Impact of vehicle air-conditioning on fuel economy, tailpipe emissions, and electric vehicle range," Tech. Rep., National Renewable Energy Laboratory, http://www.nrel.gov/docs/fy00osti/28960.pdf, 2000;

T. M. Nilsson and G. A. Niklasson, "Radiative cooling during the day: simulations and experiments on pigmented polyethylene cover foils," *Solar Energy Materials and Solar Cells*, Vol. 37, No. 1, pp. 93-118, 1995;

S. Catalanotti, V. Cuomo, G. Piro, D. Ruggi, V. Silvestrini, and G. Troise, "The radiative cooling of selective surfaces," *Solar Energy*, Vol. 17, No. 2, pp. 83-89, 1975;

C. G. Granqvist, A. Hjortsberg, "Surfaces for radiative cooling: Silicon monoxide films on aluminum", *Applied Physics Letters.*, Vol. 36, pp. 139-141, 1980;

C. G. Granqvist, A. Hjortsberg, "Radiative cooling to low temperatures: General considerations and application to selectively emitting sio films", *Journal of Applied Physics* 52, 4205-4220, 1981;

P. Berdahl, M. Martin, F. Sakkal, "Thermal performance of radiative cooling panels", *International Journal of Heat and Mass Transfer* 26, 871-880, 1983;

B. Orel, M. Gunde, A. Krainer, "Radiative cooling efficiency of white pigmented paints", *Solar Energy* 50, 477-482, 1993;

C. N. Suryawanshi, C.-T. Lin, "Radiative cooling lattice quantization and surface emissivity in thin coatings", *ACS Applied Materials and Interfaces* 1, 1334-1338, 2009;

A. R. Gentle, G. B. Smith, "Radiative heat pumping from earth using surface phonon resonant nanoparticles", *Nano Letters* 10, 373-379, 2010;

T. M. Nilsson, G. A Niklasson, C. G. Granqvist, "A solar reflecting material for radiative cooling applications: Zns pigmented polyethylene", *Solar Energy Materials and Solar Cells* 28, 175-193, 1992;

T. M. Nilsson, G. A Niklasson, "Radiative cooling during the day: simulations and experiments on pigmented polyethylene cover foils", *Solar Energy Materials and Solar Cells* 37, 93-118, 1995;

U.S. Pat. No. 4,323,619, "Covering element screening off the solar radiation for applications in the refrigeration by radiation";

E. Rephaeli, A. Raman, S. Fan, "Ultrabroadband photonic structures to achieve high-performance daytime radiative cooling", *Nano Letters* 13, 1457-1461, 2013;

S. Lin, et. al, "Enhancement and suppression of thermal emission by a three-dimensional photonic crystal", *Phys. Rev. B* 62, R2243-R2246, 2000;

J. Schuller, T. Taubner, M. Brongersma, "Optical antenna thermal emitters", *Nature Photonics* 3, 658-661, 2009;

J. Greffet, "Applied physics: Controlled incandescence", *Nature* 478, 191-192, 2011;

A. Narayanaswamy, G. Chen, "Thermal emission control with one-dimensional metalloid-electric photonic crystals", *Phys. Rev. B* 70, 125101, 2004;

I. Celanovic, D. Perreault, J. Kassakian, "Resonant-cavity enhanced thermal emission", *Physical Review B* 72, 075127, 2005;

E. Rephaeli, S. Fan, "Absorber and emitter for solar thermos-photovoltaic systems to achieve efficiency exceeding the Shockley-queisser limit", *Opt. Express* 17, 15145-15159, 2009;

C. Wu, et al., "Metamaterial-based integrated plasmonic absorber/emitter for solar thermo-photovoltaic systems", *Journal of Optics* 14, 024005, 2012;

M. De Zoysa, et al., "Conversion of broadband to narrowband thermal emission through energy recycling", *Nature Photonics* 6, 535-539, 2012;

M. Isaac, D. P., van Vuuren, "Modeling global residential sector energy demand for heating and air conditioning in the context of climate change", *Energy Policy* 37, 507-521, 2009;

D. B. Crawley, et al., "Energyplus: Energy simulation program", *ASHRAE Journal* 42, 49-56, 2000;

M. Deru, et al., "US department of energy commercial reference building models of the national building stock", *Tech. Rep.*, National Renewable Energy Laboratory, 2011;

W. Marion, K. Urban, "User's manual for tmy2s", *Tech. Rep.*, National Renewable Energy Laboratory, 1995;

M. Campbell, "Charting the progress of pv power plant energy generating costs to unsubsidized levels, introducing the pv-lcoe framework", In *Proceedings of the 26th European Photovoltaic Solar Energy Conference*, Hamburg (Germay), 4409-4419, 2011, M. S. Keshner, R. R. Arya, "Study of potential cost reductions resulting from super-large-scale manufacturing of pv modules", *Tech. Rep.*, Final Subcontract Reports, NREL/SR-520-36846, National Renewable Energy Laboratory, 2004; and M. Bazilian, et al., "Re-considering the economics of photovoltaic power", *Renewable Energy* 53, 329-338, 2013.

Further, the following Appendices are hereby fully incorporated by reference for their general and specific teachings: Appendix A entitled "Passive radiative cooling below ambient air temperature under direct sunlight", Appendix B, and Appendix C. Consistent with embodiments of the present disclosure Appendix A describes and shows examples of radiative cooling apparatuses and energy savings using example radiative cooling apparatuses in accordance with the present disclosure. Appendix B describes and shows examples of radiative cooling apparatuses including alternative configurations of radiative cooling apparatuses, in accordance with the present disclosure. Further Appendix C describes and shows examples of a radiative cooling apparatus formed of two-dimensional photonic crystals.

Various embodiments described above, and shown in the figures may be implemented together and/or in other manners. One or more of the items depicted in the present disclosure can also be implemented in a more separated or integrated manner, or removed and/or rendered as inoperable in certain cases, as is useful in accordance with particular applications. In view of the description herein, those skilled in the art will recognize that many changes may be made thereto without departing from the spirit and scope of the present disclosure.

What is claimed is:

1. A radiative cooling apparatus for cooling an object comprising:
   an arrangement of a plurality of different materials located at different depths along a depth dimension relative to the object, the plurality of different materials including:
      a solar spectrum reflecting portion configured and arranged to suppress light modes, thereby inhibiting coupling of incoming electromagnetic radiation, of at least some wavelengths in the solar spectrum, to the object at a range of angles of incidence relative to the depth dimension; and
      a thermally-emissive portion configured and arranged without patterned holes and with a portion of the different material that is arranged in the depth dimension to facilitate, simultaneously with the inhibiting coupling of the incoming electromagnetic radiation, thermally-generated electromagnetic emissions from the object at the range of angles of incidence and in mid-IR wavelengths.

2. The apparatus of claim 1, wherein the arrangement of the plurality of different materials includes a multi-layer stack of alternating different materials, wherein each layer of the multi-layer stack includes a planar layer of one of the different materials located at the different depths along the depth dimension.

3. The apparatus of claim 1, further including a sealed enclosure having an outer surface exposed to an environment, the sealed enclosure configured and arranged to create a gap between the outer surface of the sealed enclosure and the arrangement of the plurality of different materials, wherein the gap is at or below ambient air pressure.

4. The apparatus of claim 1, wherein the arrangement of the plurality of different materials includes an integrated arrangement with distribution of the solar spectrum reflecting portion and the thermally-emissive portion throughout the arrangement in at least one of a width dimension of the arrangement relative to the depth dimension, a length dimension of the arrangement relative to the depth dimension, and the depth dimension.

5. The apparatus of claim 1, wherein the solar spectrum reflecting portion and the thermally-emissive portion at least in part overlap in the depth dimension.

6. The apparatus of claim 1, further including a heat exchange interface configured and arranged with the arrangement of the plurality of different materials to conduct heat away from the object.

7. The apparatus of claim 1, wherein the radiative cooling apparatus is configured and arranged to operate with or without sunlight,
wherein, during hours of the day without sunlight, the arrangement of plurality of different materials is configured and arranged to facilitate thermally-generated electromagnetic emissions from the object and in mid-IR wavelengths.

8. The apparatus of claim 7, wherein, during hours of the day with sunlight, the arrangement of the plurality of different materials is configured and arranged to simultaneously prohibit coupling of incoming electromagnetic radiation to the object of at least some wavelengths in the solar spectrum and facilitate thermally-generated electromagnetic emissions from the object and in the mid-IR wavelengths.

9. The apparatus of claim 1, wherein the arrangement of the plurality of different materials includes a multi-layer stack of alternating layers of $SiO_2$ and at least one of $HfO_2$ and $TiO_2$ of varying thicknesses, each layer located at the different depths along the depth dimension, and the arrangement of the plurality of different materials is further configured and arranged to absorb light from 300 nanometers to 4 micrometers and reflect at least 90% of solar power at incidence, while also presenting greater than 20% thermal emissivity from 8 micrometers to longer wavelengths.

10. The apparatus of claim 1, wherein the solar spectrum reflecting portion and the thermally-emissive portion are each formed of planar layers of the different materials, each planar layer located at the different depths along the depth dimension.

11. The apparatus of claim 1, wherein the solar spectrum reflecting portion is formed of a layer of polytetrafluoroethylene (PFTE) and the thermally-emissive portion is formed of a layer of glass material.

12. The apparatus of claim 11, wherein the glass material includes a plurality of layers of at least one of $TiO_2$ and $SiO_2$, the plurality of layers being configured and arranged to provide emissivity near 9 microns.

13. The apparatus of claim 1, wherein the solar spectrum reflecting portion is formed by multiple layers of TiO2 and SiO2, or Ta2O5 and SiO2, in addition to a substrate of Ag, and the thermally-emissive portion is formed of a layer of glass material.

14. The apparatus of claim 1, wherein the radiative cooling apparatus is configured and arranged to, during exposure to direct sunlight, reduce a temperature corresponding with the plurality of materials of the radiative cooling apparatus from ambient air temperature.

15. A method for radiatively cooling an object, the method comprising:
using a solar spectrum reflecting portion of an arrangement to suppress light modes and thereby prohibit coupling of incoming electromagnetic radiation, of at least some wavelengths in the solar spectrum, to the object at a range of angles of incident relative to a depth dimension;
using a thermally-emissive portion of the arrangement that is without patterned holes to facilitate, simultaneously with the prohibit of coupling of the incoming electromagnetic radiation, thermally-generated electromagnetic emissions from the object at the range of angles of incident and in mid-infrared (IR) wavelengths;
wherein the solar spectrum reflecting portion and the thermally-emissive portion are integrated in the arrangement formed of a plurality of materials located at different depths along the depth dimension relative to the object; and
wherein a gap is at least in part surrounding the arrangement of the plurality of materials, the gap created by a sealed enclosure having an outer surface exposed to the environment and configured and arranged to create the gap between the outer surface of the enclosure and the arrangement of the plurality of different materials and wherein the gap is at or below ambient air pressure.

16. The method of claim 15, further including providing radiative cooling of at least 20 Watts/meter$^2$ at an ambient temperature of 300 degrees Kelvin and with an equivalent of direct sunlight striking the arrangement of the plurality of materials, and
wherein providing the radiative cooling includes providing a temperature using the plurality of materials that is at least 4-5 degrees Celsius below ambient air temperature while the plurality of materials is exposed to direct sunlight.

17. The method of claim 15, wherein using the solar spectrum reflecting portion to suppress light modes further includes inhibiting coupling of incoming electromagnetic radiation of wavelengths from 300 nanometers to 4 micrometers; and
wherein using the thermally-emissive portion further includes facilitating thermally-generated emissions by coupling surface phonon-polaritons or bulk lossy modes due to lattice vibration to free-space light modes.

18. A radiative cooling apparatus for cooling an object comprising:
an arrangement of a plurality of different materials located at different depths along a depth dimension relative to an object, the plurality of different materials including:
a solar spectrum reflecting portion configured and arranged to suppress light modes, thereby inhibiting coupling of incoming electromagnetic radiation, of at least some wavelengths in the solar spectrum, to the object at a range of angles of incidence relative to the depth dimension; and
a thermally-emissive portion configured and arranged without patterned holes, that includes a portion of the different materials that are arranged in the depth dimension, configured and arranged to facilitate, simultaneously with the inhibiting coupling of the incoming electromagnetic radiation, thermally-generated electromagnetic emissions from the object at the range of angles of incidence and in mid-IR wavelengths;
a sealed enclosure having an outer surface exposed to an environment, the sealed enclosure configured and arranged to create a gap between the outer surface of the sealed enclosure and the arrangement of the plurality of different materials, wherein the gap has a pressure that is at or below an ambient air pressure; and
a heat exchange interface configured and arranged with the arrangement of the plurality of different materials, and to conduct heat away from the object by using the radiative properties of the plurality of different materials.

19. The apparatus of claim 18, wherein the heat exchange interface further comprises:
a conductive pipe configured and arranged to pass liquid; and
a plate heat exchanger configured and arranged with the arrangement of the plurality of different materials and the conductive pipe, the plate heat exchanger configured and arranged to cool liquid passing through the conductive pipe to conduct heat away from the object.

20. The apparatus of claim 19, wherein the arrangement of the plurality of different materials further includes a metal layer that is in thermal contact with at least a portion of the plate heat exchanger to effect a temperature of the at least portion of the plate heat exchanger.

* * * * *